(12) United States Patent
Yonezawa et al.

(10) Patent No.: US 7,222,356 B1
(45) Date of Patent: May 22, 2007

(54) COMMUNICATION APPARATUS, STORAGE MEDIUM, CAMERA AND PROCESSING METHOD

(75) Inventors: Hiroki Yonezawa, Yokohama (JP); Yasuo Nakamura, Yokohama (JP); Koichiro Tanaka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/480,861

(22) Filed: Jan. 11, 2000

(30) Foreign Application Priority Data

Jan. 14, 1999 (JP) ................................. 11-007555

(51) Int. Cl.
*H04N 7/173* (2006.01)
(52) U.S. Cl. ........................ 725/105; 725/114; 725/116; 348/14.05; 348/14.07; 348/14.02; 348/211; 348/159
(58) Field of Classification Search ................... 348/61, 348/207, 211, 159, 385, 14.05, 14.07, 14.02; 725/105, 114, 116
See application file for complete search history.

(56) References Cited

U.S. PATENT DOCUMENTS

| | | | |
|---|---|---|---|
| 5,909,543 A | 6/1999 | Tanaka et al. | 395/200.34 |
| 6,208,379 B1* | 3/2001 | Oya et al. | 348/211.11 |
| 6,271,752 B1* | 8/2001 | Vaios | 340/541 |
| 6,670,984 B1* | 12/2003 | Tanaka et al. | 348/159 |
| 6,680,746 B2* | 1/2004 | Kawai et al. | 348/211.9 |
| 2001/0045983 A1* | 11/2001 | Okazaki et al. | 348/211 |

* cited by examiner

*Primary Examiner*—Shawn S. An
(74) *Attorney, Agent, or Firm*—Fitzpatrick, Cella, Harper & Scinto

(57) ABSTRACT

In a system wherein one or more controllable camera(s) and one or more monitor(s) for displaying video information received from the camera(s) are connected to each other through a communication device, the states of all the cameras can be always understood at any monitor. Map management server software is provided to receive notification(s) of camera state information by all the cameras with the predetermined device, and to transmit the camera state information to all the monitors.

6 Claims, 36 Drawing Sheets

FIG. 5
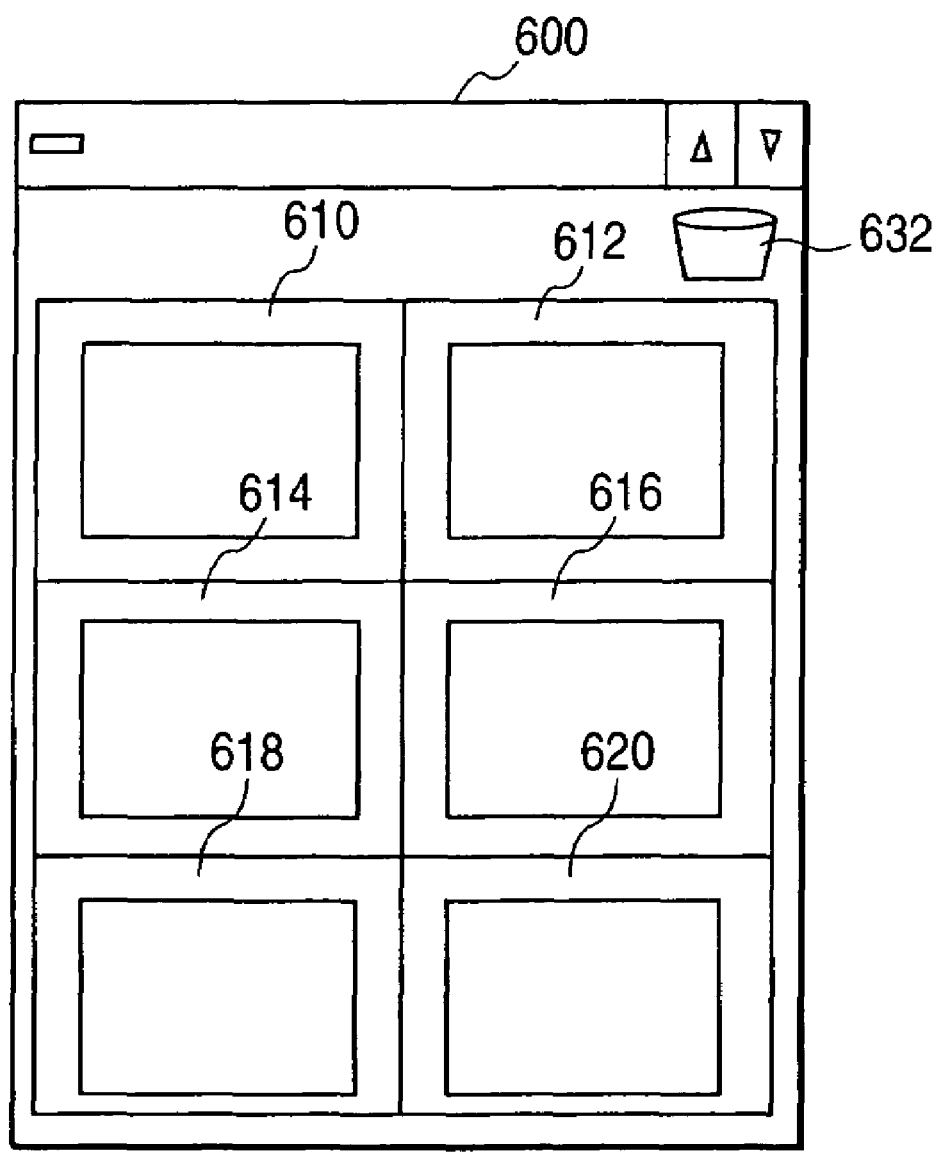
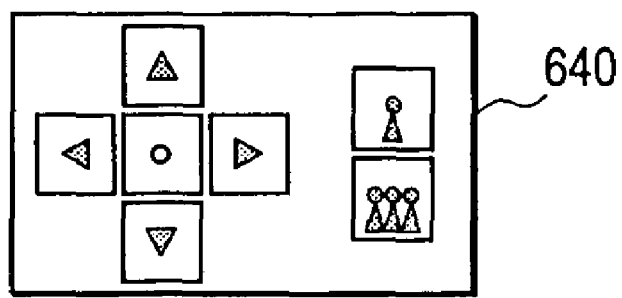

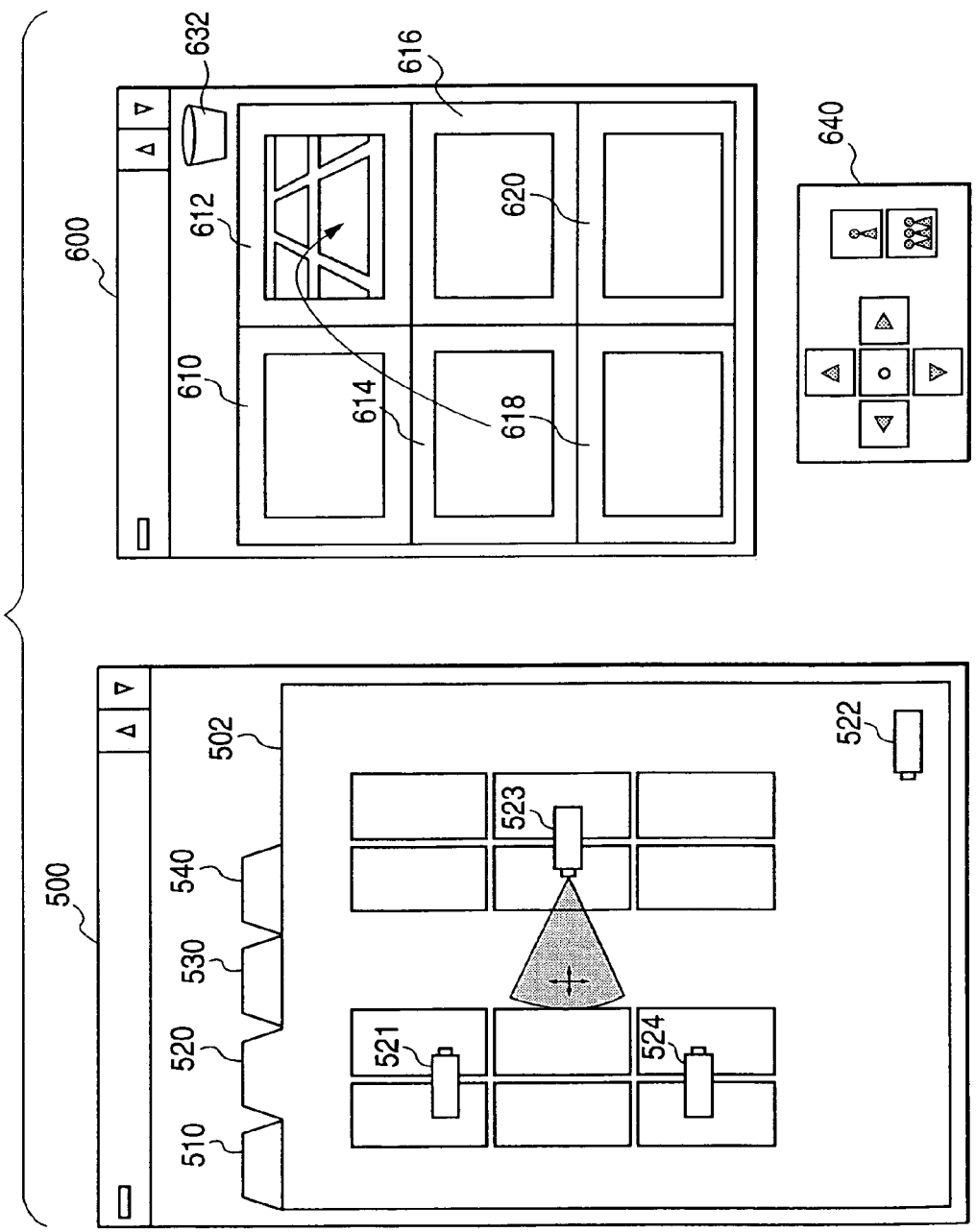

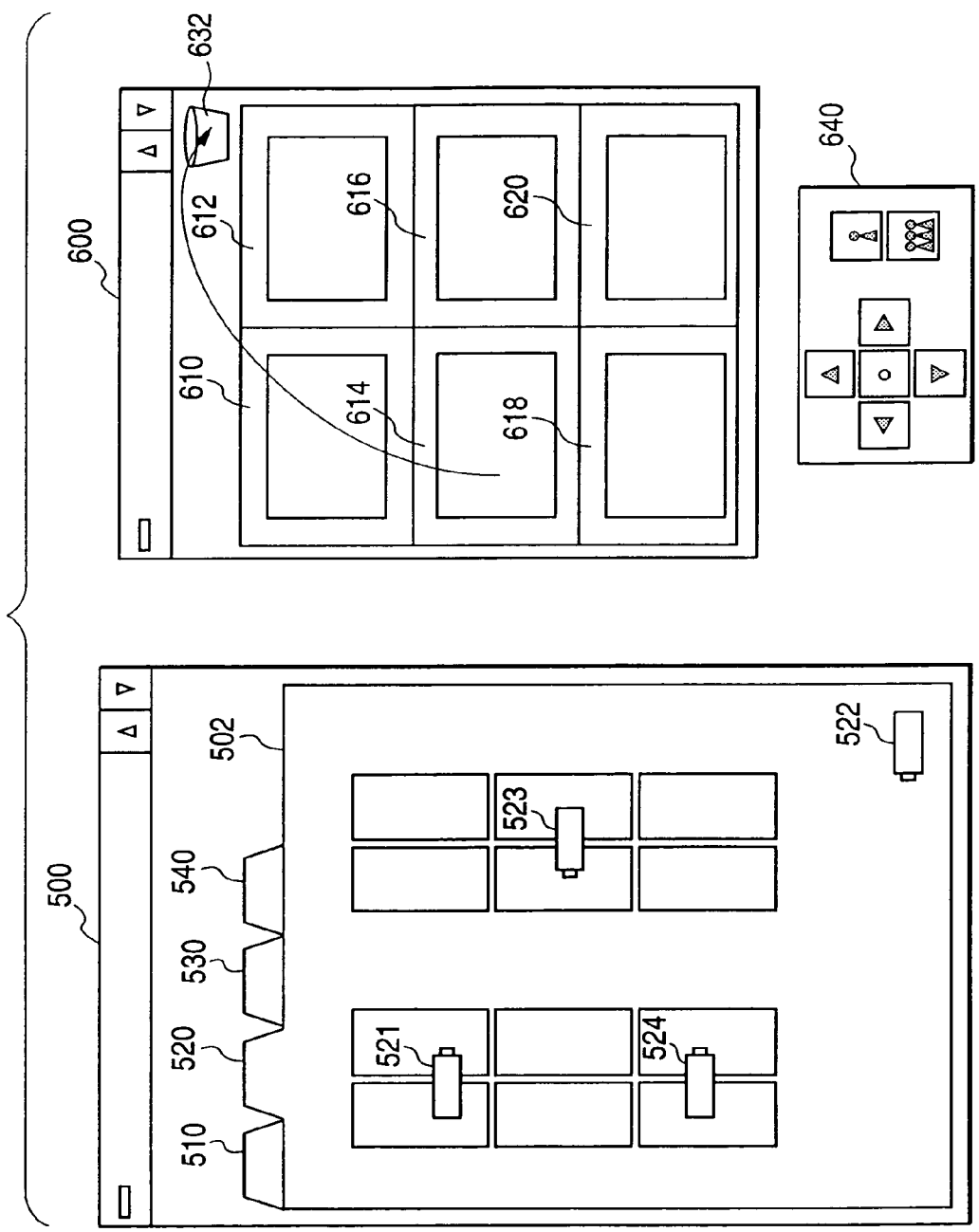

COMMUNICATION APPARATUS, STORAGE MEDIUM, CAMERA AND PROCESSING METHOD

BACKGROUND OF THE INVENTION

1. Field of the Invention

The present invention relates to a communication apparatus, a storage medium, a camera and a processing method.

2. Related Background Art

A video transmission system has been proposed in which, for example, plural video cameras and computers are located inside a building, and these video cameras and the computers are networked through communication lines, thereby realizing video transmission among plural desired points and interactive communication by video and audio.

In this video transmission system, a user of the computer at one point (local computer) can remote-control the video camera at a desired remote point and display the video taken by the remote-controlled video camera on the screen of the user's local computer.

Further, in a video transmission system capable of remote-controlling a remote video camera, especially, as the number of the video cameras to be remote-controlled increases, it is necessary for the user to easily understand where each video camera is located. Thus, a technique which superimposes a camera symbol representing the location of each video camera on an image representing a map has been proposed. Further, a technique which represents the direction of picture taking of the actual video camera by displaying the direction/orientation of the camera symbol has been proposed.

In the above system, there is a case where a video camera which is represented by a camera symbol superimposed on the map is operated and controlled by a user at a remote location. In this case, as long as the terminal which utilizes that map does not obtain a state update of the video camera concerned, a problem exists in that the state of the camera symbol does not correspond to the state of the actual video camera.

SUMMARY OF THE INVENTION

An object of the present invention is to provide a communication apparatus, a storage medium, a camera and a processing method which can unitarily control information concerning video cameras and transmit such information to all terminals operating the video cameras.

As one preferred example of the present invention, there is provided a communication apparatus which is connected to at least one camera and at least one monitor and manages information concerning a state of the at least one camera, comprising:

reception means for receiving the information concerning the state of the at least one camera; and transmission means for transmitting the information concerning the state of the at least one camera received by the reception means to the at least one monitor, so as to change a display concerning the state of the at least one camera displayed on the at least one monitor, wherein the transmission means transmits the information in correspondence with the change of the state of the at least one camera.

Another object of the present invention is to provide a communication apparatus, a communication method, a camera and a processing method each of which has a new function.

Other objects and features of the present invention will become apparent from the following detailed description and the attached drawings.

BRIEF DESCRIPTION OF THE DRAWINGS

FIG. 5 is a view showing a display example of a window for displaying video from a video camera, according to one embodiment of the present invention;

FIG. 8 is a view showing the state when a display area by the drag-and-drop operation is changed, according to one embodiment of the present invention;

FIG. 10 is a view showing the state of an operation to stop a display by the drag-and-drop operation according to one embodiment of the present invention;

DETAILED DESCRIPTION OF THE PREFERRED EMBODIMENTS

First Embodiment

Figure 1:
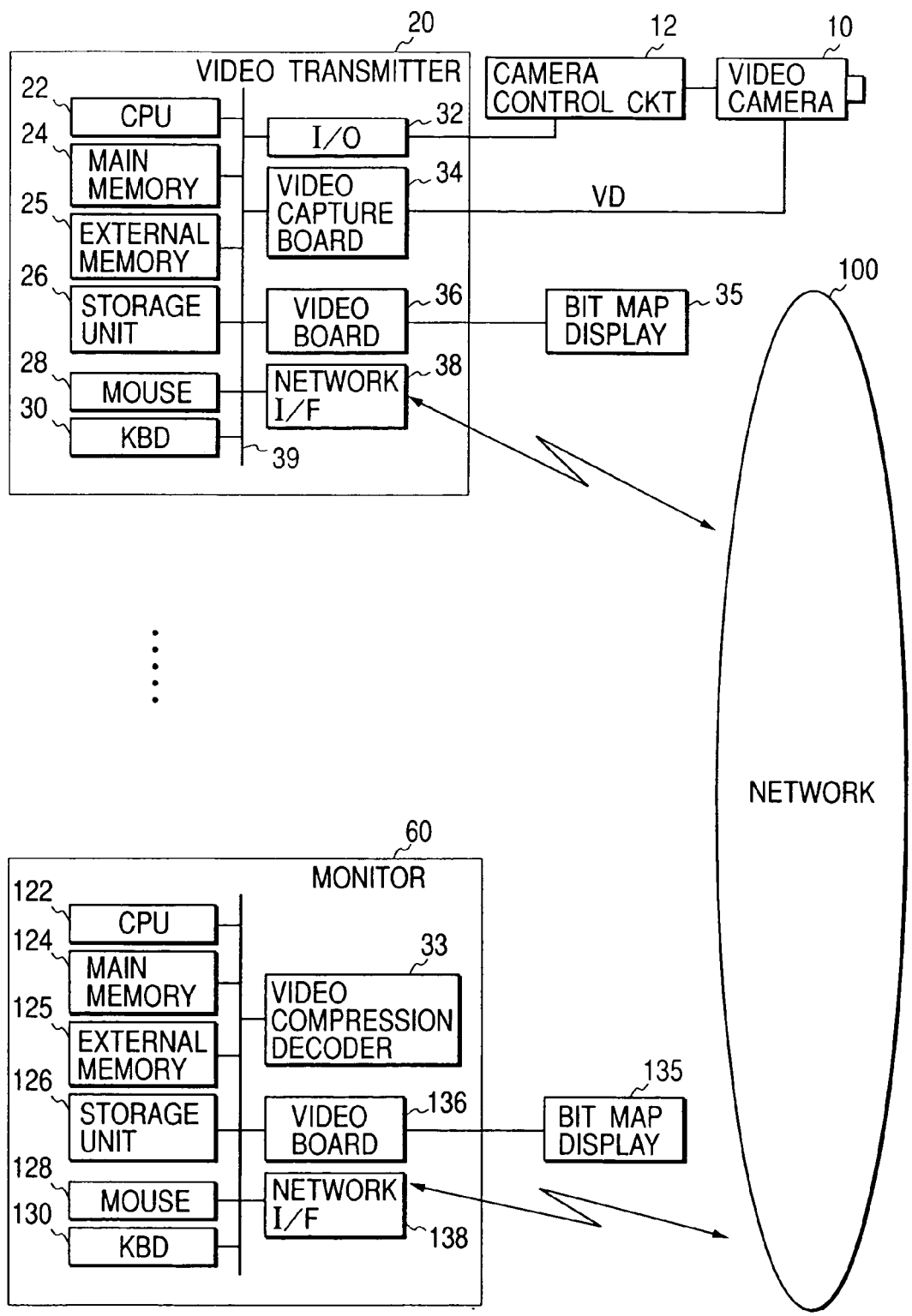
FIG. 1 is a block diagram showing the overall structure of a communication system including a video communication system according to one embodiment of the present invention.

FIG. 1 is a block diagram showing the overall structure of a communication system including a video communication system according to one embodiment of the present invention.

In FIG. 1, numeral 10 denotes a video camera which generates video (or an image signal) on the basis of a taken (captured) image. Numeral 20 denotes a video transmitter such as a work station (WS), a personal computer (PC) or the like which transmits the image signal from the video camera 10 to a monitor 60 and receives a control signal from the monitor 60 to control the video camera 10. Numeral 60 denotes a monitor, such as a WS, a PC or the like, which receives an image signal from the video transmitter 20 and transmits a control signal to the video transmitter 20 to control the video camera 10.

Plural video transmitters 20 and plural monitors 60 can communicate with each other through a network 100. Preferably, the video transmitter analog-to-digital (A/D) converts the image signal from the video camera 10 into digital image data, compresses the obtained digital image data, and transmits the compressed data to the monitor 60 through the network 100.

Numeral 12 denotes a camera control circuit which controls panning, tilting, zooming, focusing and iris stopping operations in accordance with a control signal (i.e., a control code) from the video transmitter 20. The control signal is input via an input/output interface (I/O) 32 of the video transmitter 20 to the camera control circuit 12 on the basis of, e.g., an RS-232C standard or the like.

If a video camera 10 does not perform panning, tilting, zooming, focusing and iris stopping operations, a camera control circuit 12 is not always necessary. However, it is preferable to control at least an ON/OFF function of the power supply of the video camera 10.

(Video Transmitter 20)

Next, the structure of the video transmitter 20 will be explained. Numeral 24 denotes a main memory, and numeral 26 denotes a storage unit such as a hard disk or the like. Numeral 28 denotes a mouse which acts as a pointing device. However, other devices such as a touch panel on a bit map display 35 and the like may be also used. Numeral 30 denotes a keyboard which acts as input means. Numeral 25 denotes an external memory from which a storage medium such as a floppy disk, a CD-ROM or the like is detachable. Numeral 32 denotes an I/O which is connected to the camera control circuit 12 to transmit and receive a control signal of the video camera 10. Numeral 34 denotes a video capture board which captures a video output signal VD of the video camera 10. The video output signal VD may be an analog signal such as a general NTSC (National Television System Committee) signal or a digital signal. If the signal VD is an analog signal, it is necessary for the video capture board 34 to have an A/D conversion function. Numeral 36 denotes a video board which obtains video captured by the video capture board 34 through a system bus 39 and displays the obtained video at an arbitrary location on the bit map display 35. Numeral 38 denotes a network interface (I/F) which communicates with the monitor 60 through the network 100. The above units are connected to each other through the system bus 39, and a CPU 22 controls the video transmitter 20 as a whole and the display of the bit map display 35 in accordance with software stored in the storage medium or the storage unit 26 or software obtained through the network 100.

If the video capture board 34 does not have a data compression function, it is possible to provide software for realizing such a function, whereby the CPU 22 can perform data compression processing.

Using a video transmitter 20 as structured above, the image data taken by the video camera 10 is transmitted to the monitor 60 at a remote location through the network 100, and a video camera 10 is controlled according to a control code received from the monitor 60.

(Monitor 60)

Next, the structure of a monitor 60 will be explained. It should be noted that, in the monitor 60, explanation of devices or units which are the same as those in the video transmitter 20 (designated by like or similar reference numerals) will be omitted. A network I/F 138 receives compressed image data from the video transmitter 20. A CPU 122 decompresses the received data (i.e., encoded data) using a video compression decoder 33, and controls a video board 136 on the basis of the decompressed image data to cause a bit map display 135 to display the image taken by the video camera 10 and the state of the video camera 10. Further, the CPU 122 transmits a control code to the video transmitter 20, for controlling the video camera 10, in accordance with data input by the user of the monitor 60 using a keyboard 130 or a mouse 128.

Next, the software of the video transmitter 20 and the monitor 60 according to the present embodiment will be explained. It should be noted that the software explained hereinafter is executed by the hardware of the video transmitter 20 or the monitor 60.

Figure 2:
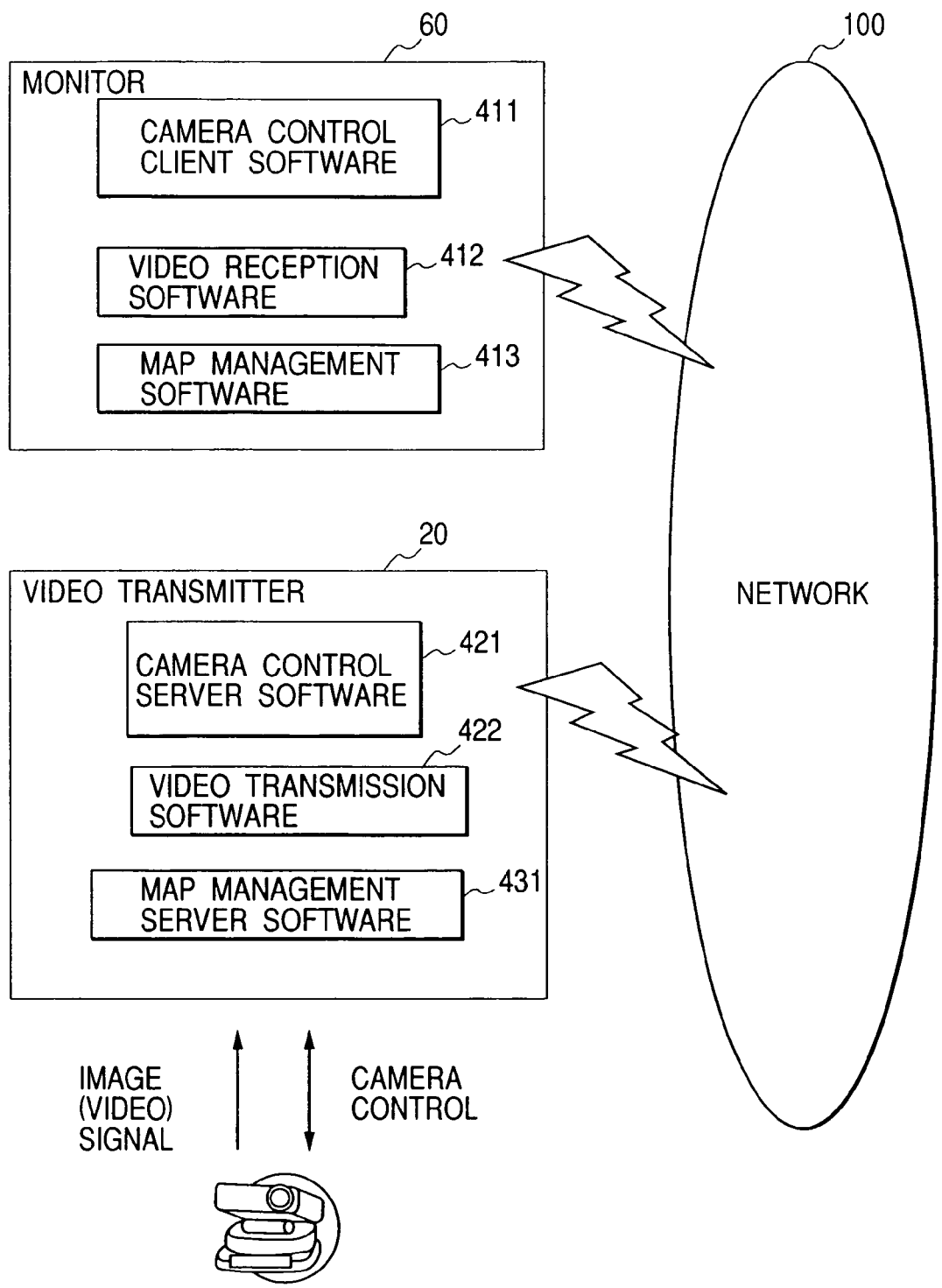
FIG. 2 is a block diagram showing the structure of main software of a video transmitter 20 and a monitor 60 according to one embodiment of the present invention.

FIG. 2 is a block diagram showing the structure of the main software of the video transmitter 20 and the monitor 60 according to one embodiment of the present invention.

First, the software to be executed by the monitor 60 will be explained. Numeral 411 denotes camera control client software which is provided to remote control a video camera 10 connected to a video transmitter 20. Numeral 412 denotes video reception software which is provided to decompress compressed image data transmitted from a video transmitter 20 in the form of packets and to display the decompressed image data. Further, the video reception software 412 is provided to manage image data received from all of the plural video transmitters 20 (i.e., the video cameras 10) connected to the network 100. Using the video reception software 412, a camera ID of each video camera, a host computer ID of the video transmitter 20 to which the video camera concerned is connected, information concerning camera operation states such as panning, tilting, zooming, focusing and iris stopping operations, information concerning whether or not the video camera concerned is controllable (accessible), state information concerning which video camera currently is being controlled, and state information concerning which video camera currently is being displayed, are stored in the monitor 60. Also, the camera control client software 411 and map management software 413 share such information, whereby the information is utilized to effect camera symbol change or the like. Numeral 413 denotes the map management software, which uses a GUI (graphical user interface) function. The GUI function is provided to graphically display the location, the panning state and the tilting state of a video camera 10 and to control the operation of the camera 10, using a map, the camera symbol and a later-described scope display of FIG. 6. The above software is prestored into the storage unit of the monitor 60.

Next, the software to be executed by the video transmitter 20 will be explained. Numeral 421 denotes camera control server software which is provided to control panning, tilting, zooming, focusing and iris stopping operations of a video camera 10 connected to a video transmitter 20, and also to capture the image data output from the video camera 10 to the video transmitter 20. Numeral 422 denotes video transmission software which cooperates with the camera control server software 421 and is provided to transmit the video to the monitor 60 currently controlling the video camera 10. The above software is prestored into the storage unit of the video transmitter 20.

Numeral 431 denotes map management server software which is provided to unitarily manage the states of all the video cameras of the plural video transmitters 20, and to update map information. It should be noted that one map management server software 431 is executed in one system. FIG. 2 shows that the map management server software 431 is executed in a video transmitter 20. However, the map management server software 431 may be executed in a monitor 60, or in another computer connected to the network 100. In this case, the network address of the computer which executes the map management server software 431 is stored in all of the monitors 60 and video transmitters 20 connected via the network.

The map management server software 431 communicates with the video reception software of the monitor 60 and the camera control server software 421 of the video transmitter 20, to update the map information of the system.

Needless to say, in addition to the above software, software for controlling two-way communication through the network 100, software for controlling the storage units 26 and 126, software for controlling the external memories 25 and 125, and the like are provided in the system.

(User Interface)

Next, a user interface in the present embodiment, i.e., a screen which is displayed on the bit map display 135, will be explained. To simplify the explanation, the user interface will be explained on the premise that one monitor 60 is connected to the video transmitter 20 through the network.

Figure 3:
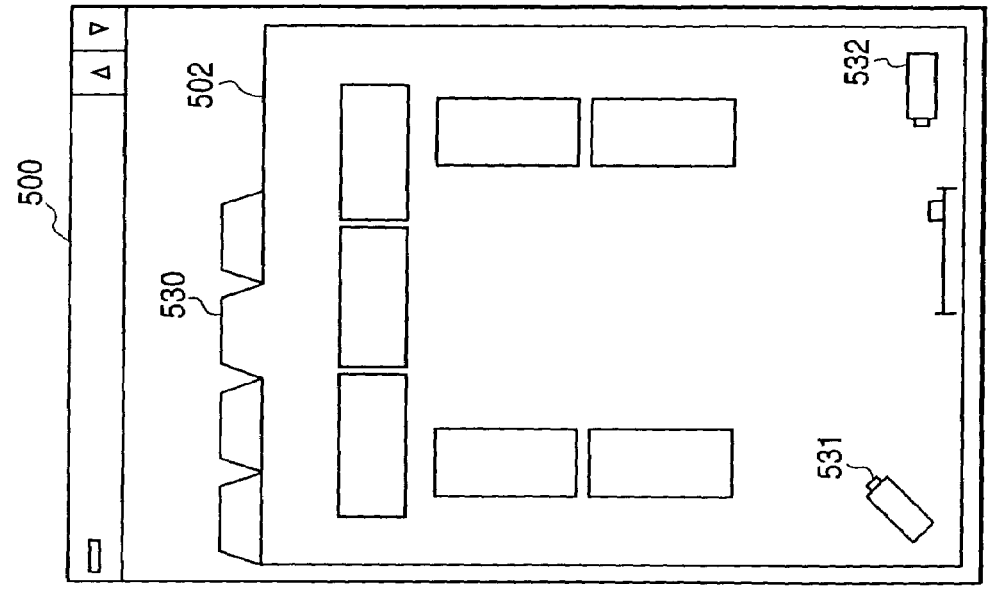
FIG. 3 is a view showing a display example of the monitor according to one embodiment of the present invention.
Figure 4:
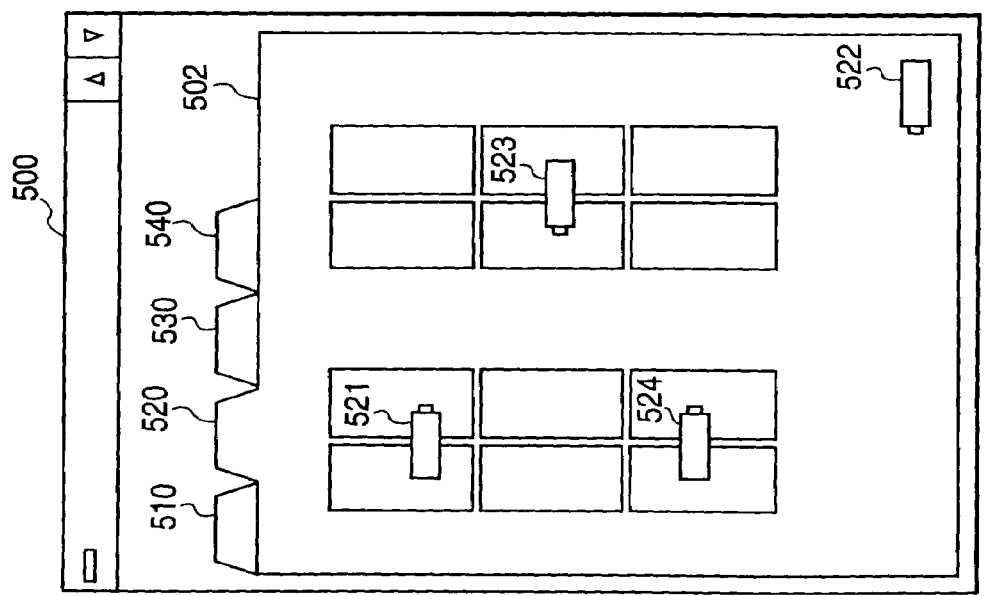
FIG. 4 is a view showing a display example of the monitor according to one embodiment of the present invention.

FIGS. 3 and 4 are views showing a display example of the monitor according to one embodiment of the present invention. Concretely, FIGS. 3 and 4 show one example of the screen displayed on the bit map display 135 of the monitor 60. In FIG. 3, numeral 500 denotes a map window in which the map is displayed. In the present embodiment, plural maps 510, 520, 530 and 540 showing layouts of offices, establishments (or stores), warehouses and the like are managed within the map window 500. Each map is provided with a map tab; if the map tab is clicked by the mouse 128, the map provided with the clicked tab is displayed up-front (as a map display area 502). At this time, camera symbols are displayed on the up-front map.

FIG. 3 shows the state that the map 520 is selected from among the maps 510 to 540 and displayed on the map display area 502. On the map 510, video camera symbols (or video camera icons) 521, 522, 523 and 524 are displayed. At this time, if the map tab of the map 530 is clicked, the map 530 will be displayed, as shown in FIG. 4.

In FIG. 4, the map 530 is displayed on the map display area 502, and video camera symbols (or video camera icons) 531 and 532 are displayed on the map 530.

FIG. 5 is a view showing a display example of a window for displaying the video (or the image) from the video camera, according to one embodiment of the present invention. As shown in FIG. 5, in a window 600, videos taken by the plural video cameras 10 are displayed on plural video display areas 610, 612, 614, 616, 618 and 620, respectively. Numeral 632 denotes a trash can icon which is used to delete (stop) displayed video from a video display area. Numeral 640 denotes a video camera control panel which includes camera control buttons for the video camera 10. It is possible by handling these buttons to control panning, tilting, zooming, focusing and iris stopping operations of the video camera 10.

In the present embodiment, six areas are displayed by way of example. However, the present invention is not limited to this. Further, these areas may be commonly displayed on the same screen as the window shown in FIG. 3 or 4.

Next, an outline of software operation of the video communication system according to the present embodiment (including the GUI) will be explained with reference to FIGS. 6, 7, 8, 9 and 10. In the present embodiment, if a camera icon on a map 520, 530 or the like is dragged and dropped (i.e., a drag-and-drop operation) onto an arbitrary video display area within the video display window, then motion video transmitted from the corresponding video camera (corresponding to the one dragged and dropped) is displayed on the video display area onto which the camera icon is dropped.

Figure 6:
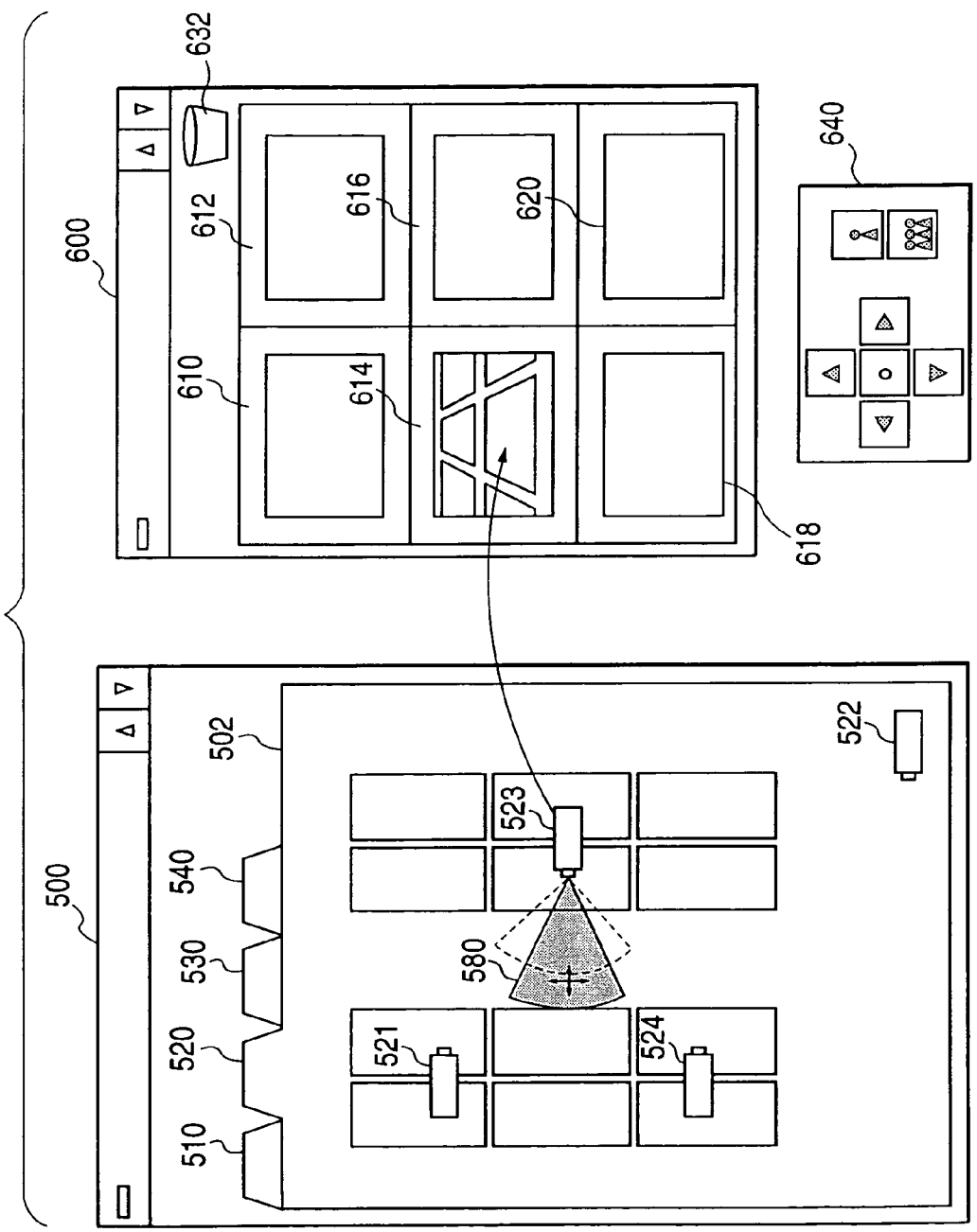
FIG. 6 is a view showing the state when display is performed by a drag-and-drop operation, according to one embodiment of the present invention.
Figure 7:
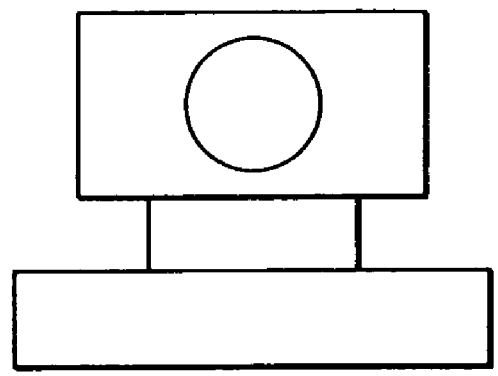
FIG. 7 is a view showing a mouse cursor of a video camera used in the drag-and-drop operation according to one embodiment of the present invention.
Figure 9:
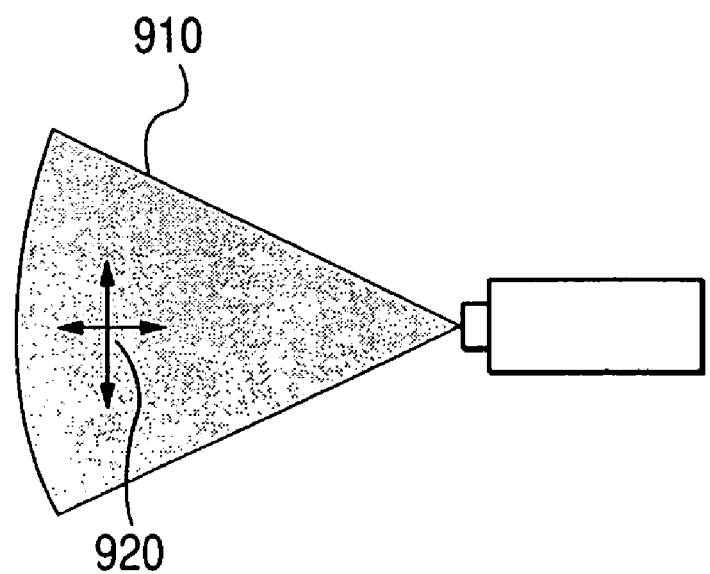
FIG. 9 is a view showing a camera icon representing that taken video is being displayed, according to one embodiment of the present invention.

FIG. 6 is a view showing the state when the display is performed by the drag-and-drop operation, according to one embodiment of the present invention. Concretely, FIG. 6 shows the state that video camera icon 523 is dragged and dropped onto the video display area 614. An area 580 represents a video-taking range of the camera 523. If the mouse cursor is located within the range 580 and the range 580 is changed from the solid-line range to a dotted-line range, a camera zooming operation is performed, whereby the video-taking range can be changed. Similarly, panning and tilting operations can be performed by managing the area 580. FIG. 7 is a view showing a mouse cursor of the video camera used in the drag-and-drop operation according to one embodiment of the present invention. FIG. 8 is the view showing the state when the location of a display area is changed from window 614 to window 612 by the drag-and-drop operation, according to one embodiment of the present invention. FIG. 9 is a view showing a camera icon representing that video is being displayed, according to one embodiment of the present invention. FIG. 10 is a view showing the state of an operation to stop the display of video in a window 614 by a drag-and-drop operation according to one embodiment of the present invention.

In the present embodiment, during a drag-and-drop operation, the shape of the mouse cursor is represented as a camera shown in FIG. 7, whereby the user can confirm that the drag-and-drop operation is being performed. At this time, on the basis of the location information of the dragged camera, the map management software 413 searches for the ID number of the camera concerned, and notifies the video reception software 412 of the ID of the dragged and dropped camera. On the basis of the notified ID, the video reception software 412 searches for the panning and tilting of the camera, the camera name and the name of the host computer to which the camera is connected, and notifies the camera control client software 411 and the map management software 413 of such information.

The camera control client software 411 communicates with the camera control server software 421 of the video transmitter 20 to which the video camera 10 is connected, through the network 100 in accordance with the notified information. Hereafter, the operation of the video camera 10 connected to the video transmitter 20 is controlled between the camera control client software 411 of the monitor 60 and the camera control server software 421 of the video transmitter 20 concerned. The information concerning the panning operation, the tilting operation and the like of the camera (i.e., the information concerning the camera state) is notified from the camera control client software 411 to the video reception software 412 for a predetermined time or for each issuance of a camera control command.

The map management software 413 updates the map stored in the video board 136, thereby changing the direction of the camera icon according to the direction of the actual video camera 10, drawing a scope 910 (FIG. 9) representing that the video (or the image) taken by the video camera 10 concerned is being displayed, and drawing a control pointer 920 (FIG. 9) within the scope 910 to control the panning, tilting and zooming operations of the camera.

Further, the information concerning the panning operation, the tilting operation and the like of the camera is notified from the video reception software 412 to the map management software 413 for a predetermined time or for each issuance of a camera control command. Thus, if the panning state, the tilting state, the zooming state and the like of the camera are changed on the camera control panel 640, such a change is reflected on the displaying states of the camera icons 521, 522, 523, 524 and the like.

If the camera control server software 421 starts, it communicates with the map management server software 431 through the network 100. Hereafter, if connection is requested from the camera control client software 411, the camera control server software 421 performs predetermined connection processing.

If video display processing starts and a connection between the camera control server software 421 and the camera control client software 411 is established, the camera control server software 421 notifies the map management server software of such a fact.

Hereafter, until the camera control server software 421 is disconnected from the camera control client software 411, the camera control server software 421 notifies the map management server software of "camera state information" every time the state of the video camera is changed or every time a certain time period, initially set by the camera control server software 421, elapses.

The camera state information includes a time (i.e., a time stamp) when the information is transmitted, attributes of the video camera (i.e., a panning value, a tilting value, a zooming value, etc.), the connection state to the camera control client software 411, a network address of the connected monitor terminal in which the camera control client software 411 is located, and the like.

The map management server software 431 unitarily manages the camera state information transmitted from the entire video camera control server software 421 running within the system.

Every time new camera state information is notified from a camera control server software, or every time a certain time period initially set elapses, the map management server software 431 notifies all the monitors 60 running within the system of the camera state information of all the connected video transmitters 20. The network address of the monitor 60 is notified to the map management server software 431 when the video reception software 412 starts operation. Also, the network address may be fixedly set in the map management server software 431 or may be obtained based on the camera state information.

The camera state information is actually received by the video reception software 412 and shared by the camera control client software 411 and the map management software 413.

The camera state information from the map management server software 431 is notified to the video reception software 412. Further, the information sent from the camera control client software 411 of the monitor 60 as a result of a camera controlling operation is notified to the video reception software 412.

In order to correctly manage this information timewise, the camera state information is time-stamp managed for each video camera in this system. When the camera state information is notified by the video reception software 412, the time stamp of each camera is compared with the previous information. If the time stamp is newer than the previous one, the time stamp is updated, while if the time stamp is older than the previous one, the time stamp is discarded.

After the camera state information is updated as above, the video reception software 412 notifies the map management software 413 of such a fact. The map management software 413 changes and updates the camera symbol on the map on the basis of that information. In this case, the change of the display represents changes of photographing range and zooming (i.e., the area 580) shown in FIG. 6.

In FIG. 2, the map management server software 431 is illustrated to be executed in a specific video transmitter 20. However, the map management server software 431 may be executed in any arbitrary video transmitter, an arbitrary monitor or another computer connected to the network.

The actual image data is transmitted from the video transmitter 20 in accordance with the request from the video reception software 412 of the monitor 60. The video reception software 412 transmits a command to the video transmission software 422 of the video transmitter 20 to which the video camera 10 concerned is connected, through the network 100. This command is to request data transmission of one frame. The video transmission software 422 receives the command, divides the captured latest frame data into packets, and then transmits these packets to the video reception software 412. The video reception software 412 reconstructs the image frame from the received packets, displays the reconstructed image frame on the video display area, and again transmits a video transmission request command. By repeating such operations at high speed, video taken at a remote location is transmitted and displayed through the network 100. Thus, video taken by a remote video camera 10 is displayed on the bit map display 135 of a local monitor 60.

When videos taken by plural video cameras 10 are displayed on plural screens, a video transmission request command is issued, a captured video is compressed, a frame is divided into packets, the divided packets are transmitted to the network, the packets are received, the frame is reconstructed, the compressed data is decompressed, and the decompressed video data is displayed in turn and repeatedly, for the video transmission software of the respective video transmitter 20 to which each camera is connected.

The video taken by the video camera can be shifted by dragging and dropping the displayed video to the desired video display area, as shown in FIG. 8. FIG. 8 shows the state that video taken by the video camera icon 523 and displayed on the video display area 614 is shifted to the video display area 612. At this time, the video reception software 412 clears the area 614, and changes internal parameters such that the area 612 (i.e., the drag-and-drop destination) acts as the video display area of the video of the camera 10. Hereafter, video taken by the video camera 10 concerned is displayed on the drag-and-drop destination. It should be noted that the logical network is not disconnected even by such operation. Namely, as described later, the once-connected communication network is not disconnected until the video display area displaying the video is dragged and dropped into the trash can icon.

The display of video taken by the video camera 10 is stopped as shown in FIG. 10. Namely, the video display area on which the video intended to be deleted is being displayed is dragged and dropped into the trash can icon 632 within the video display window. FIG. 10 shows the state after the display of the video of the video camera icon 523 on the video display area 614 is stopped. At this time, the video reception software 412 clears the area 614 to stop issuing the video transmission request command to the software 412 of the video transmitter 20 connected till then. Further, the video reception software 412 notifies the camera control client software 411 and the map management software 413 of the fact that the display was stopped.

The camera control client software 411 receives such notification, disconnects the video transmitter 20 concerned from the network, and clears the corresponding video display area. Further, the map management software 413 eliminates the scope display from the icon 523 of the video camera concerned, and updates the map.

FIGS. 12, 13, 14, 15, 16, 17, 18, 19, 20, 21, 22, 23, 24, 25, 26, 27, 28, 29, 30, 31, 32, 33, 34, 35, 36, 37 and 38 are flow charts showing the above-explained software processing.

Hereinafter, the respective steps in the flow charts will be explained.

In the flow charts, it should be noted that a step boxed by dotted lines represents processing by which some communications are performed to another software.

One software is executed in parallel with another software by the function of an operating system (OS). Further, there is a possibility that CPU resources are allocated to another software while one software is being executed.

Figure 12:
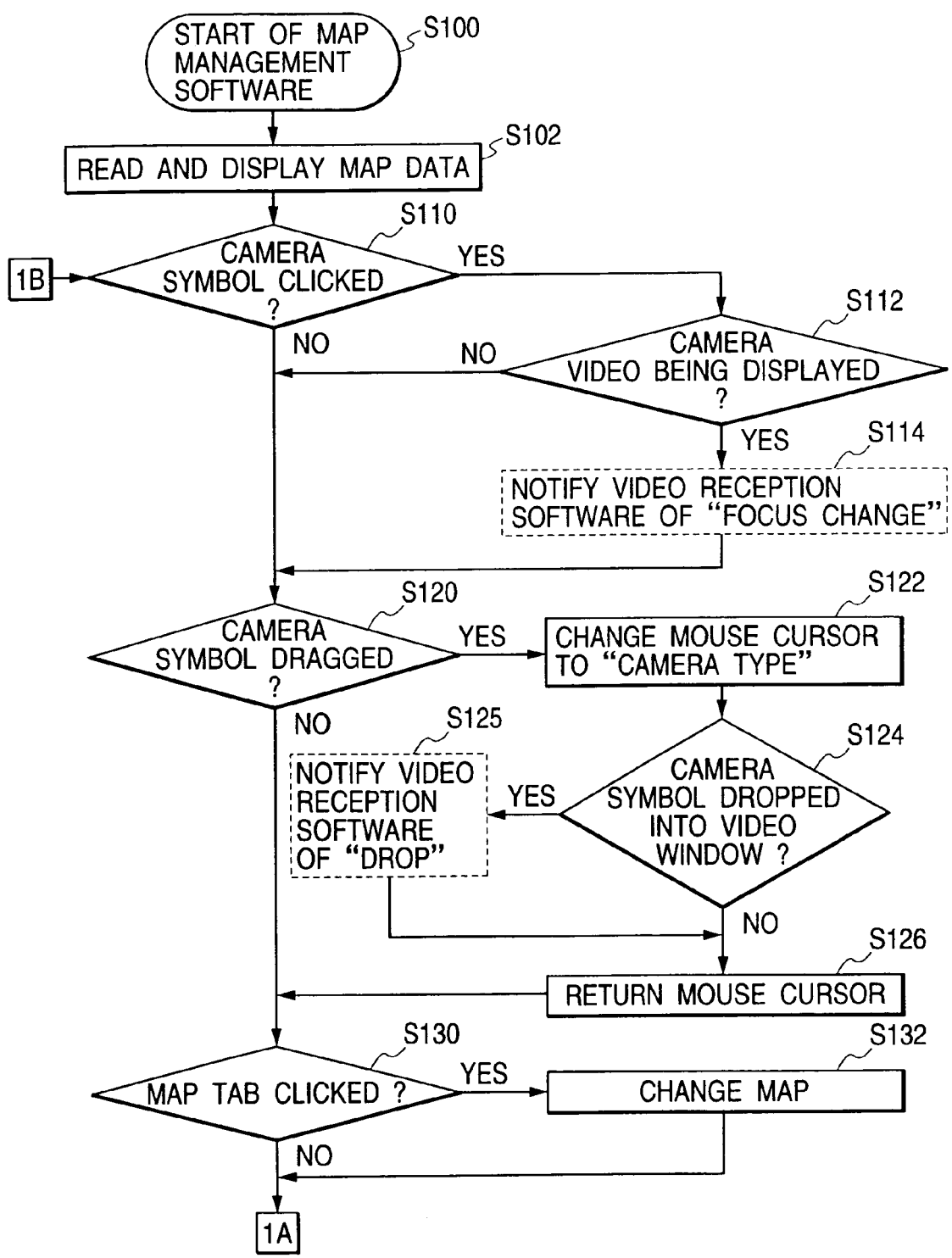
FIG. 12 is a flow chart showing an operation of map management software according to one embodiment (first embodiment) of the present invention.
Figure 13:
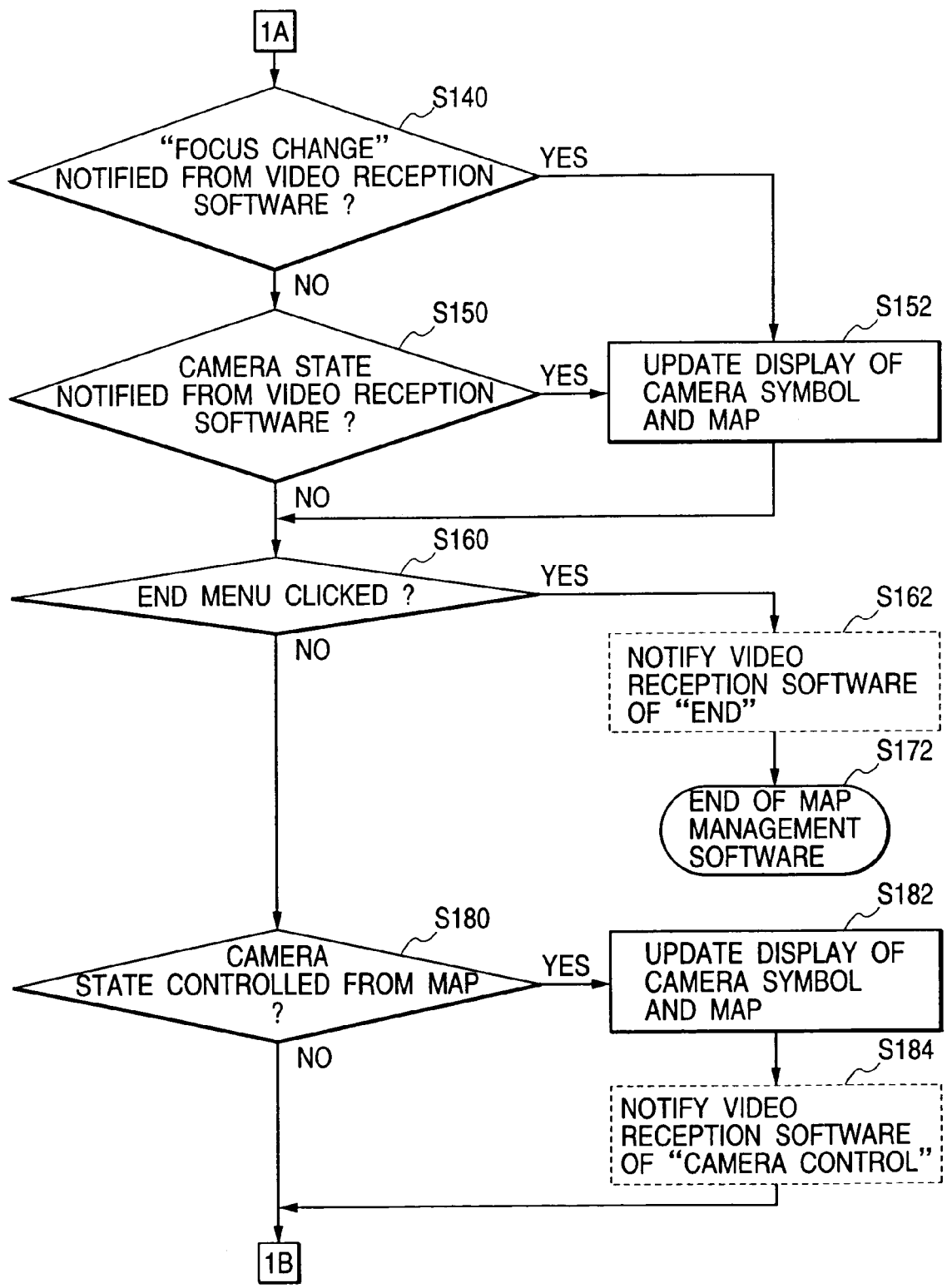
FIG. 13 is a flow chart showing the operation of map management software according to one embodiment (first embodiment) of the present invention.
Figure 14:
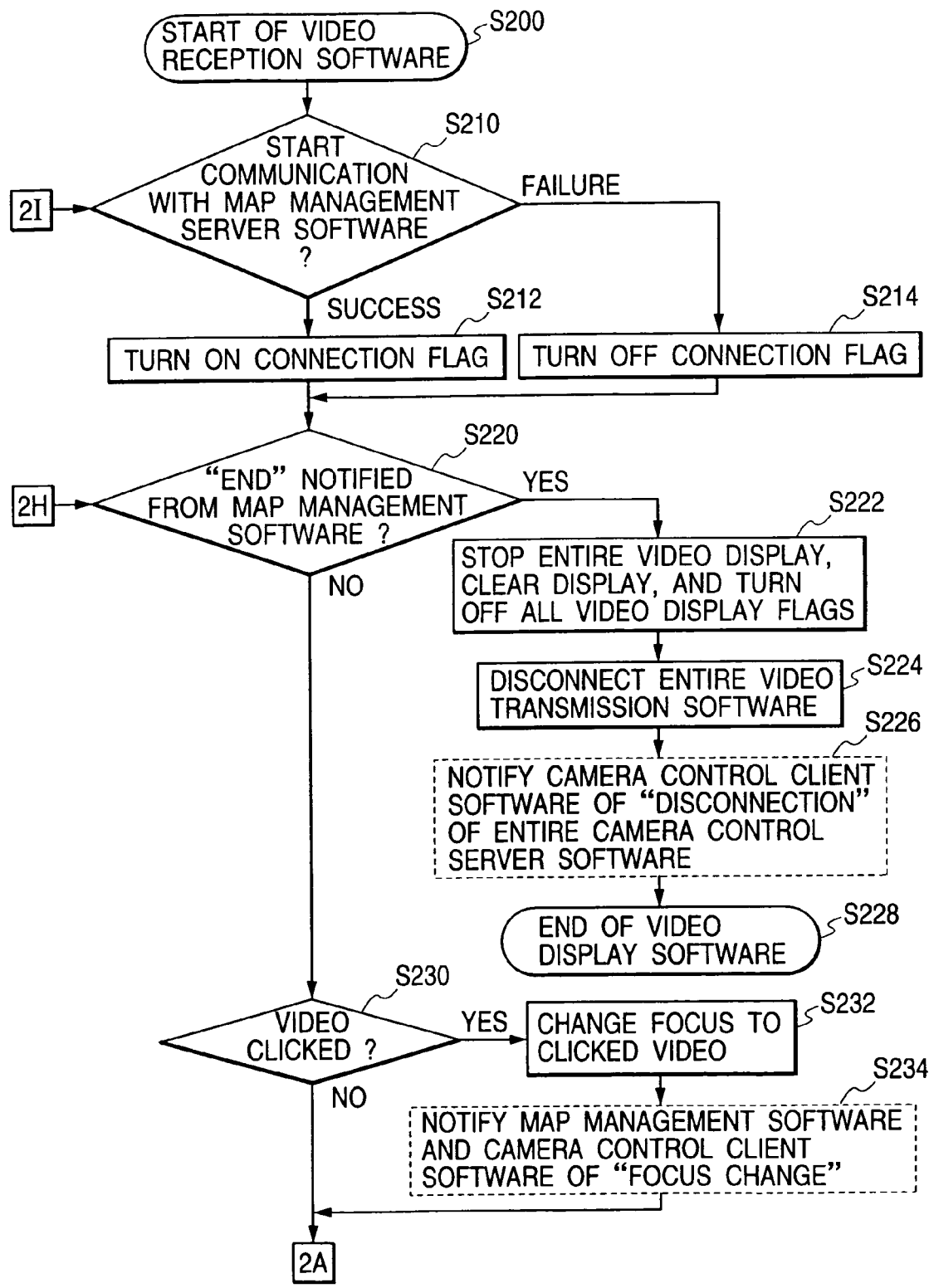
FIG. 14 is a flow chart showing an operation of video reception software according to one embodiment (first embodiment) of the present invention.

(Map Management Software: FIGS. 12 and 13)

In steps S100 and S102, the map management software 413 shown in FIG. 2 starts operation, and, for example, the map window 500 shown in FIG. 3 is displayed on the bit map display 135.

Steps S110, S112 and S114 represent processing when the camera symbol (e.g., the video camera icon 521 of FIG. 3) on the window 500 is clicked. If the video of the video camera represented by this camera symbol has been displayed on the video window (e.g., the video display area 610 of FIG. 5), the map management software 413 notifies the video reception software of focus change (i.e., change of the target to be controlled). This processing will be explained later in step S285.

Steps S120, S122, S124, S125 and S126 represent processing when the camera symbol (e.g., the video camera icon 521 of FIG. 3) on the map window is dragged. While the symbol is being dragged, the shape of the mouse cursor is changed, as shown in FIG. 7. Then, the shape of the mouse cursor is restored when the cursor is dropped.

When the mouse cursor is dropped into a video window, the map management software 413 notifies the video reception software of the drop operation. This processing will be explained later in a step S260.

In steps S130 and S132, when the map tab of a map (e.g., the map 510, 520 or 530 of FIG. 6) is clicked, the map is changed to the map having the clicked map tab, and the display of the map and the camera symbols is updated.

Steps S140, S150 and S152 represent processing which is performed when a focus change (i.e., a change of the target to be controlled) is notified from the video reception software by clicking the video on the video window in later-described steps S234, S256 and S267.

Then, the map is changed such that a camera symbol corresponding to a focused video is displayed at the center of the map window, and the camera symbol is displayed.

If a camera state is notified from the video reception software in later-described steps S257, S268, S296 and S314, the state display of the camera symbol is updated according to the camera state information.

In steps S160, S162 and S172, when the end menu on the map window displayed by a predetermined operation is clicked, the map management software 413 notifies the video reception software of the end, and the map management software ends.

Steps S180, S182 and S184 represent processing which is performed when the video camera is controlled by dragging the map symbol (e.g., the control pointer 920 of FIG. 9) with the mouse. The map management software 413 updates the display state of the camera symbol concerned, and notifies the video reception software to control the corresponding video camera.

(Video Reception Software: FIGS. 14 to 20)

In step S200, the video reception software 412 starts operation, and the video window (i.e., the window 600) is displayed on the bit map display 135.

In steps S210, S212 and S214, the video reception software 412 is connected to the predetermined map management server software and starts communication. In this case, an internal flag is set to ON if the video reception software 412 succeeds in connecting with the map management server software, while the internal flag is set to OFF if the video reception software 412 fails to make a connection.

In steps S220, S222, S224, S226 and S228, if the map management software 413 ends due to the processing in steps S160, S162 and S172, the video reception software 412 stops displaying the video and disconnects the video transmission software. Then, the map management software 413 notifies the camera control client software to disconnect the camera control server software, and the video reception software ends.

In steps S230, S232 and S234, if the displayed video (e.g., the video of the display area 614 of FIG. 6) is clicked, the focus (the target to be controlled) is changed to the clicked video, and the video reception software 412 notifies the map management software and the camera control client software of focus change (i.e., change of the target to be controlled). Therefore, the map management software performs the processing in step S140, and the camera control client software performs the processing in step S420 (see below).

Steps S240, S241, S242, S244, S246, S247, S248, S250, S251, S252, S253, S254, S255, S256, S257, S258 and S259 represent processing which is performed when the displayed video (e.g., the video of the display area 614 of FIG. 8) is dragged to the display area 612, or when the displayed video (i.e., the video of the display area 614 of FIG. 10) is dragged to the display area 632 (trash can).

Figure 15:
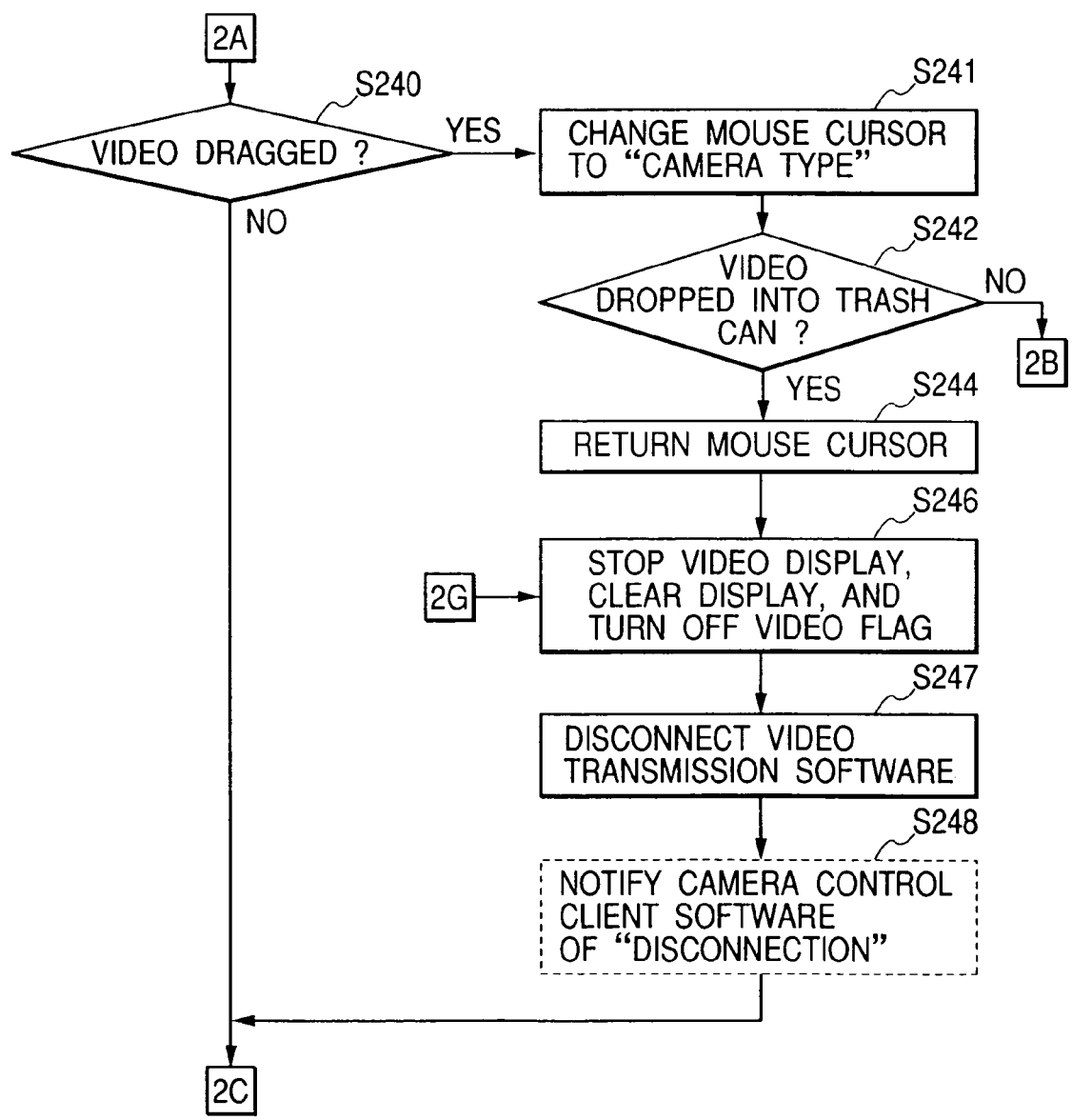
FIG. 15 is a flow chart showing the operation of video reception software according to one embodiment (first embodiment) of the present invention.
Figure 16:
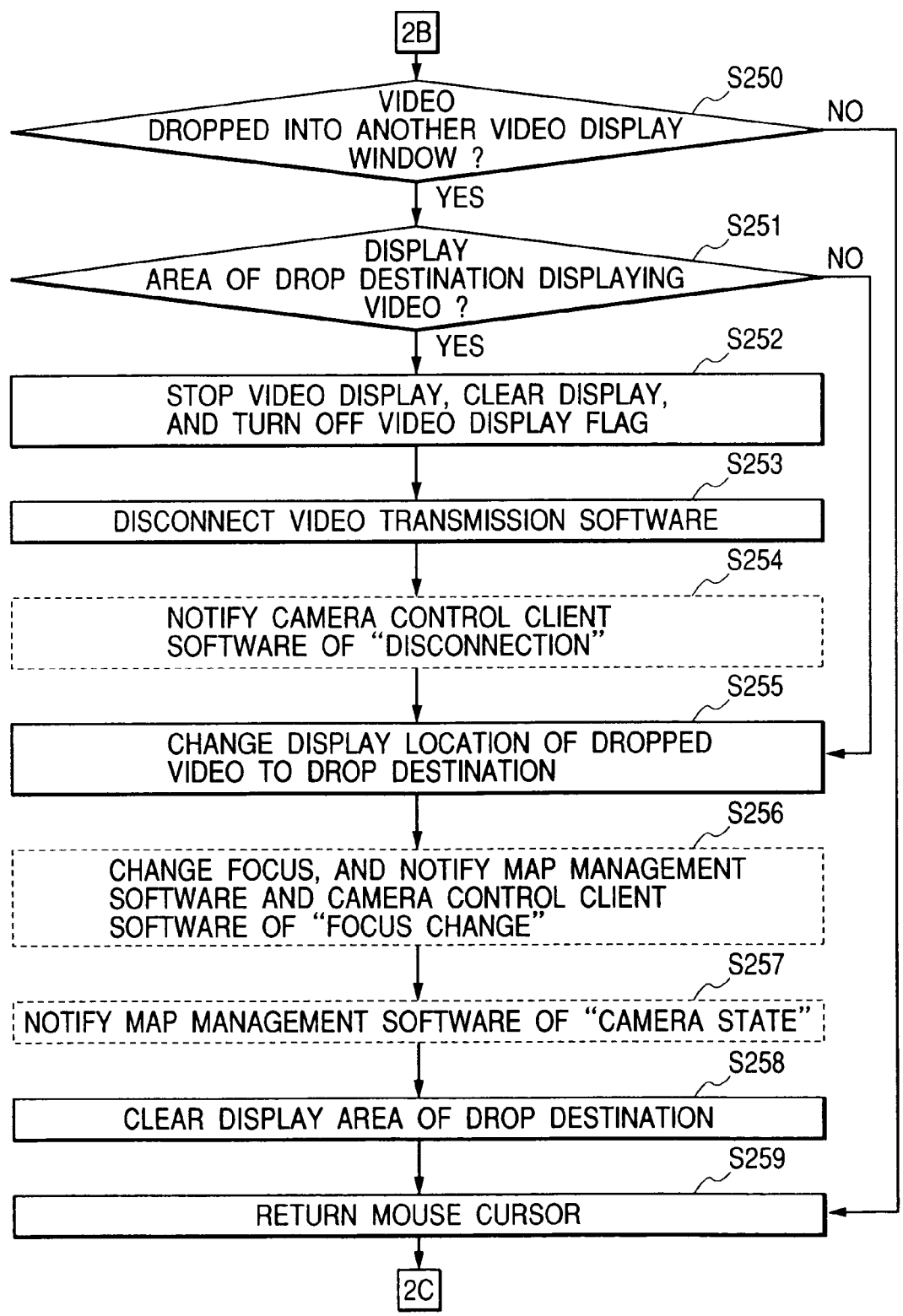
FIG. 16 is a flow chart showing the operation of video reception software according to one embodiment (first embodiment) of the present invention.

If the video is dropped into the trash can icon, the display of the dropped video is stopped, and communication with the camera from which the video was being transmitted ends (FIG. 15). If the video is dropped into another video display window in which no video is being displayed, the video is shifted to this video display window (i.e., the drop destination window). On the other hand, if there is a video being displayed in this drop destination window, communication with the camera which transmits the video to this drop destination window ends, and the dragged/dropped video display is shifted to this video display window (i.e., the drop destination window; see FIG. 16).

Steps S260, S261, S262, S263, S264, S265, S266, S267 and S268 represent processing which is performed when, e.g., video camera icon 523 is dropped into the video display area 614, as shown in FIG. 6.

Figure 17:
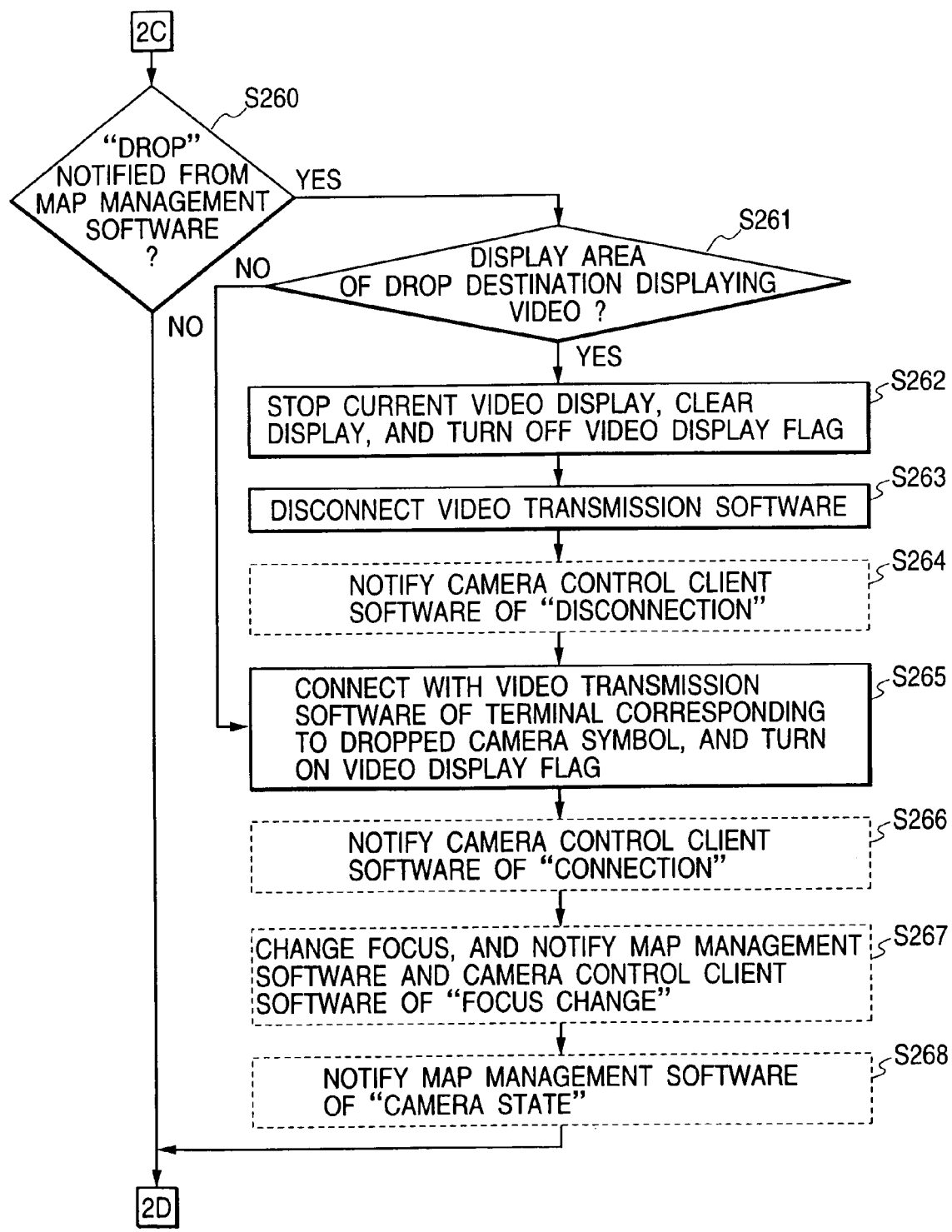
FIG. 17 is a flow chart showing the operation of video reception software according to one embodiment (first embodiment) of the present invention.
Figure 18:
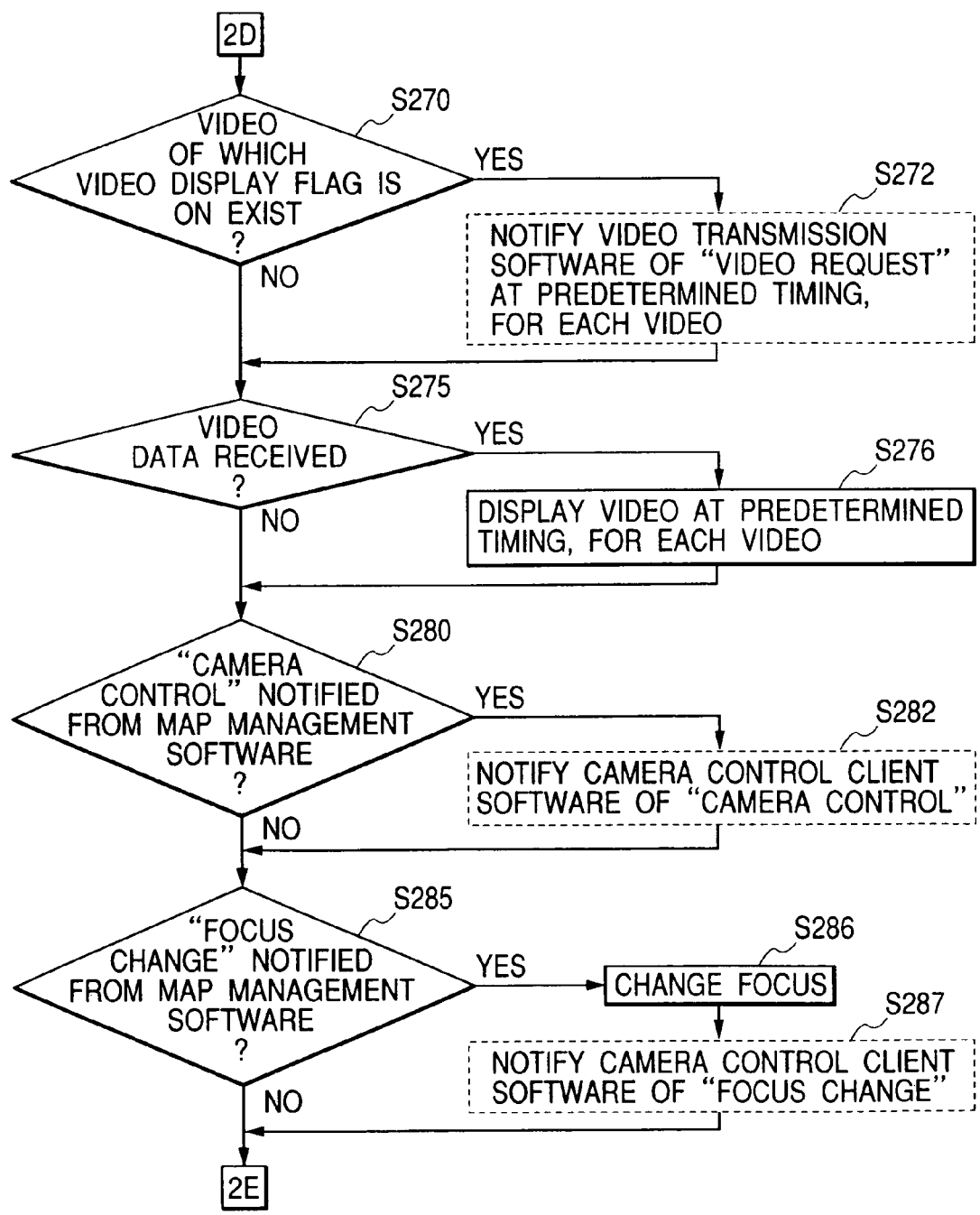
FIG. 18 is a flow chart showing the operation of video reception software according to one embodiment (first embodiment) of the present invention.
Figure 19:
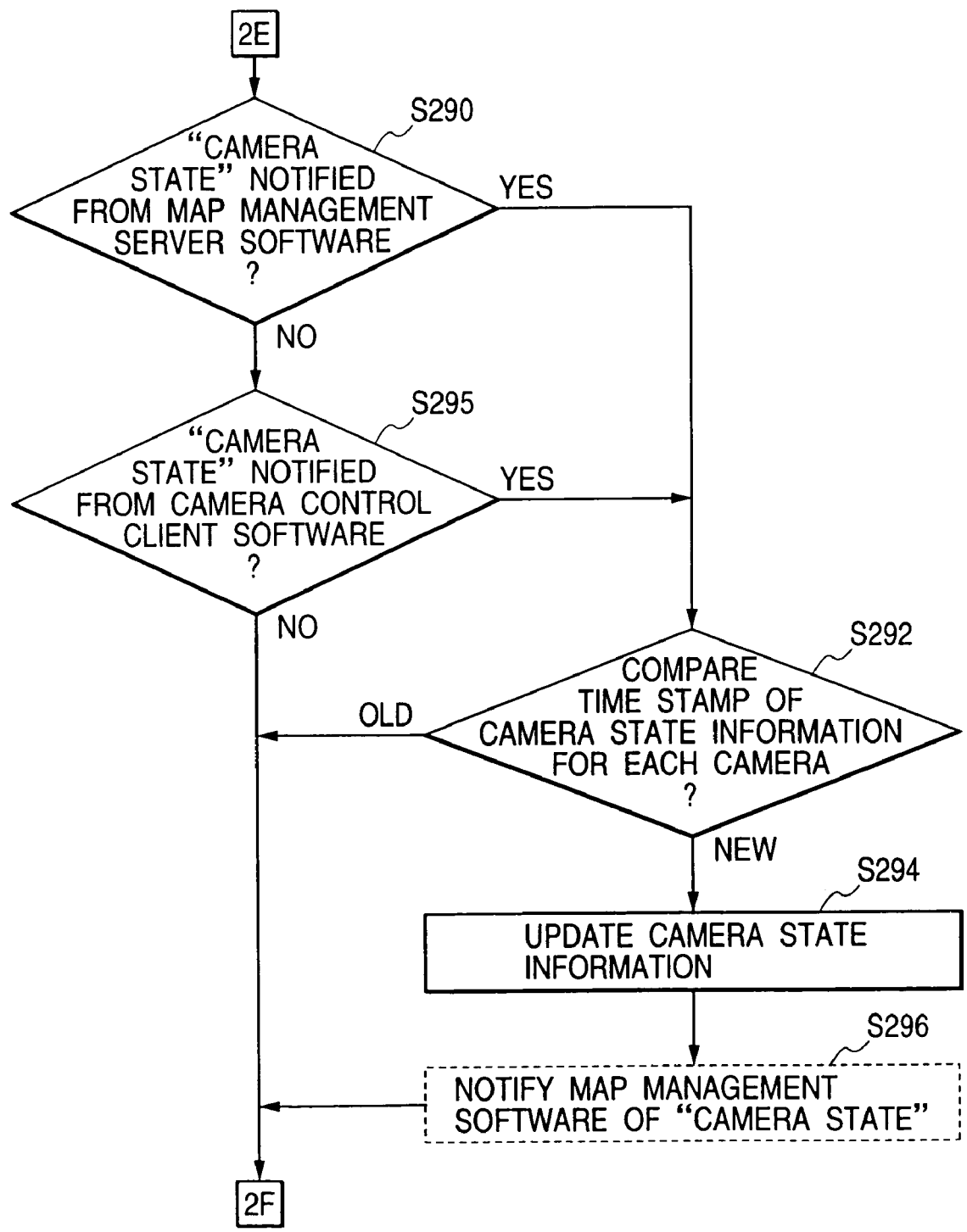
FIG. 19 is a flow chart showing the operation of video reception software according to one embodiment (first embodiment) of the present invention.
Figure 20:
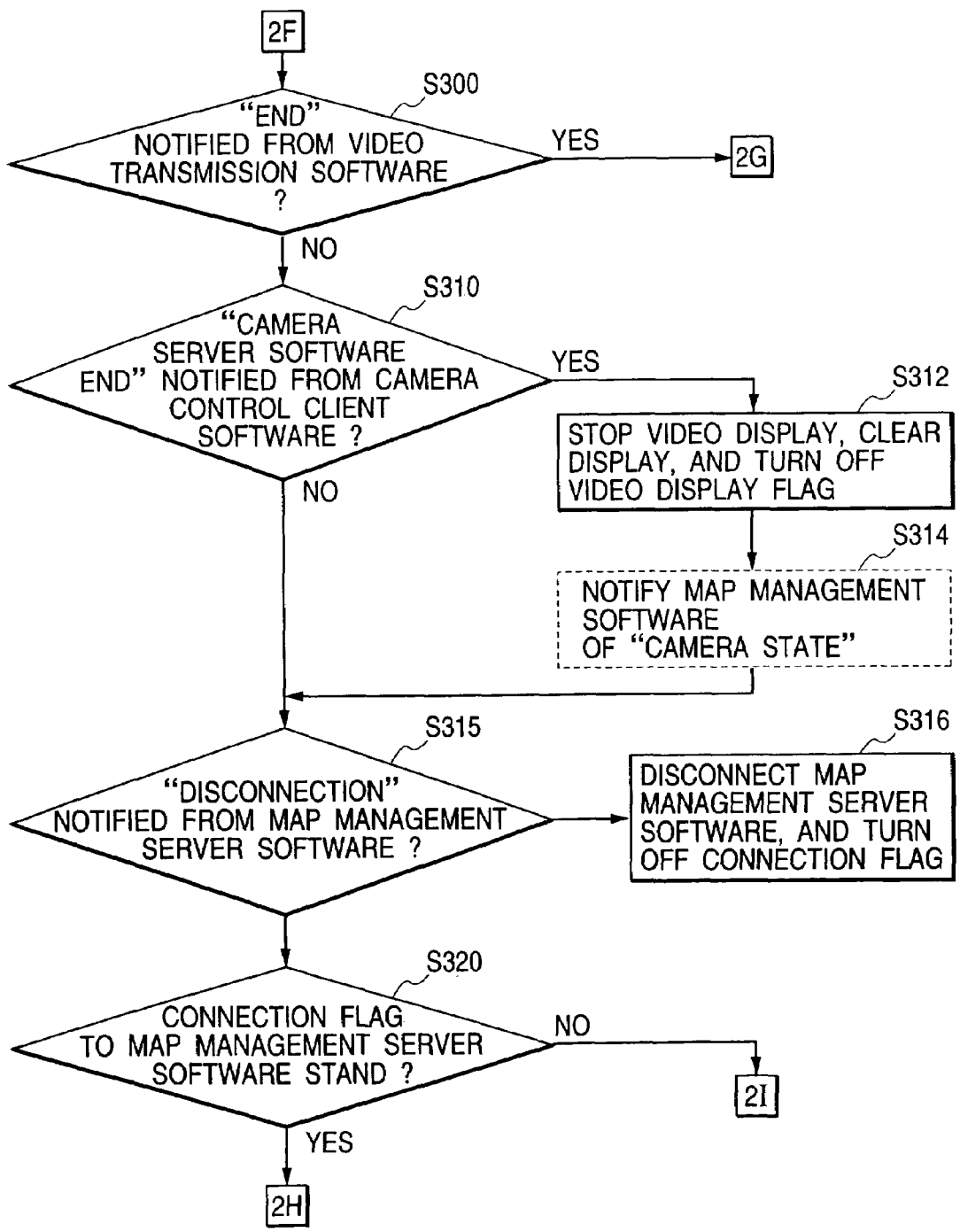
FIG. 20 is a flow chart showing the operation of video reception software according to one embodiment (first embodiment) of the present invention.

If there is video being displayed in the display area of the drop destination, communication with the video camera which transmits this video ends. Thus, the video which is transmitted from the terminal corresponding to the video camera icon 523 is displayed in the display area of the drop destination (FIG. 17).

Steps S270 and S272 represent processing which is performed when the video information is updated in the case where video is being displayed, after the processing in steps S260 to S268. In this processing, video is requested to the video transmission software at predetermined timing. Then, the video transmission software performs processing in accordance with a later-described S530.

Steps S275 and 8276 represent processing which is performed when the video information is transmitted from the video transmission software.

Steps S280 and S282 represent processing which is performed when the camera symbol on the map management software is mouse-operated (steps S180 to S184).

The video reception software notifies the camera control client software to control the video camera which is currently being focused (i.e., the target to be controlled). Thus, the camera control client software performs the corresponding processing in a later-described step S430.

Steps S285, S286 and S287 represent processing which is performed when the camera symbol on the map management software is clicked by the mouse (steps S110 to S114).

The video reception software notifies the camera control client software to change the focus (i.e., the target to be controlled) of the camera corresponding to the camera symbol. Thus, the camera control client software performs the processing in a later-described step S420.

Steps S290, S292, S294, S295 and S296 represent processing which is performed when the camera state is notified from the map management software or the camera control client software.

The camera state information of the overall camera control server software connected is transmitted from the map management server software, at a timing when the new information is transmitted from the camera control server software and the camera state information is updated.

A camera control instruction is transmitted from the camera control client software to the camera control server software every time the video camera is controlled.

The camera state information transmitted to the video reception software is subjected to old and new judgment using the time stamp for each video camera. The camera state information is updated if it is new, while the camera state information is discarded if it is old.

The updated camera state information is notified to the map management software and processed in step S150.

In step S300, if the connected video transmission software ends due to the processing of later-described steps S510 to S514, the video transmission software concerned is disconnected.

In steps S310, S312 and S314, if the camera control server software to which the camera control client software is connected ends due to the processing of later-described steps S410 to S412, the video transmission software of the video transmitter 20 to which the camera control server software is connected is disconnected.

In steps S315 and S316, if the connected map management server software ends, the connection flag to the map management server software is turned OFF, and the map management server software is disconnected.

In step S320, the connection flag to the map management server software is checked, and reconnection processing is performed if the map management server software is not connected.

This processing prevents restart of the entire system when the map management server software is temporarily stopped for some reasons and then restarted.

Figure 21:
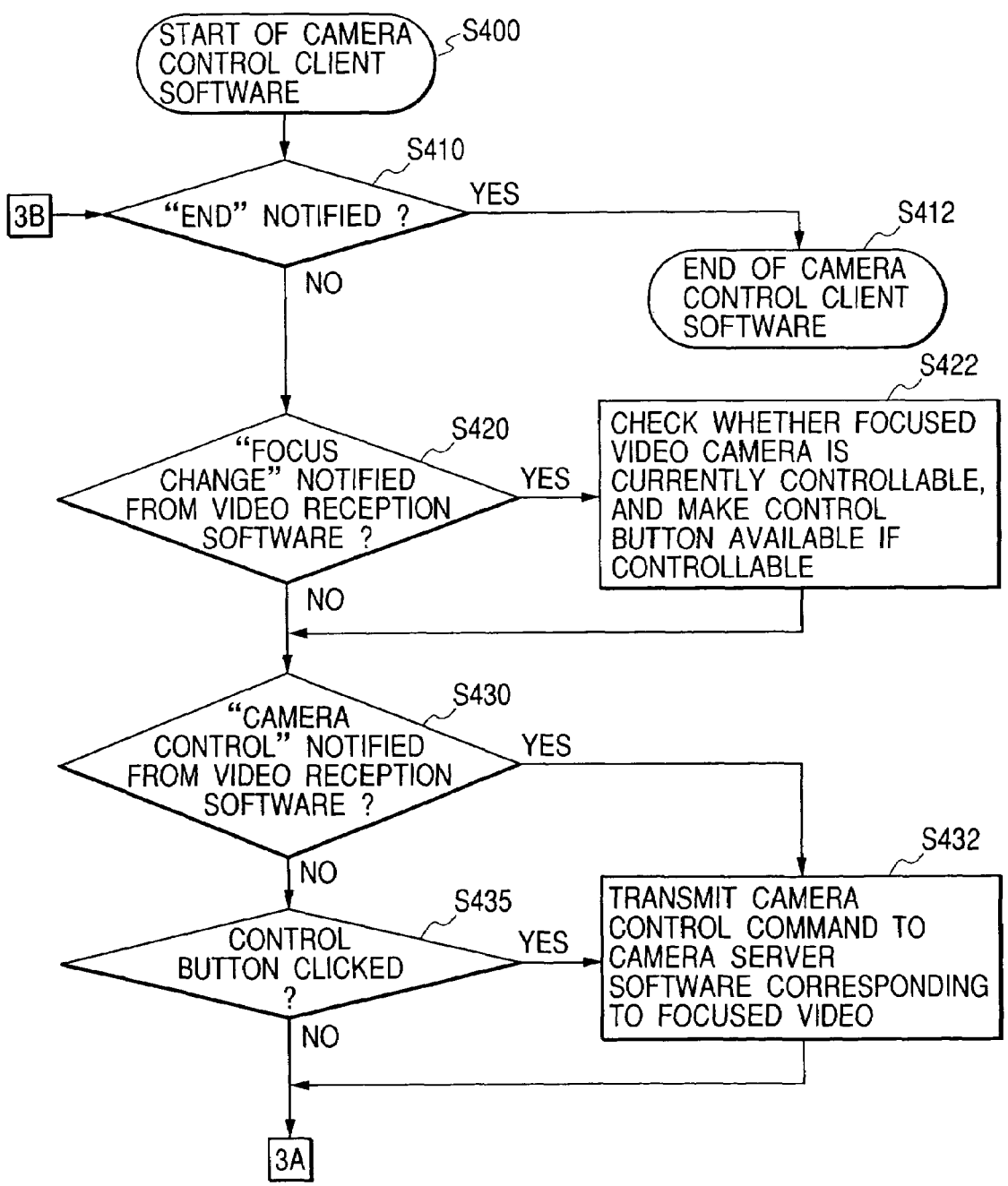
FIG. 21 is a flow chart showing an operation of camera control client software according to one embodiment (first embodiment) of the present invention.
Figure 22:
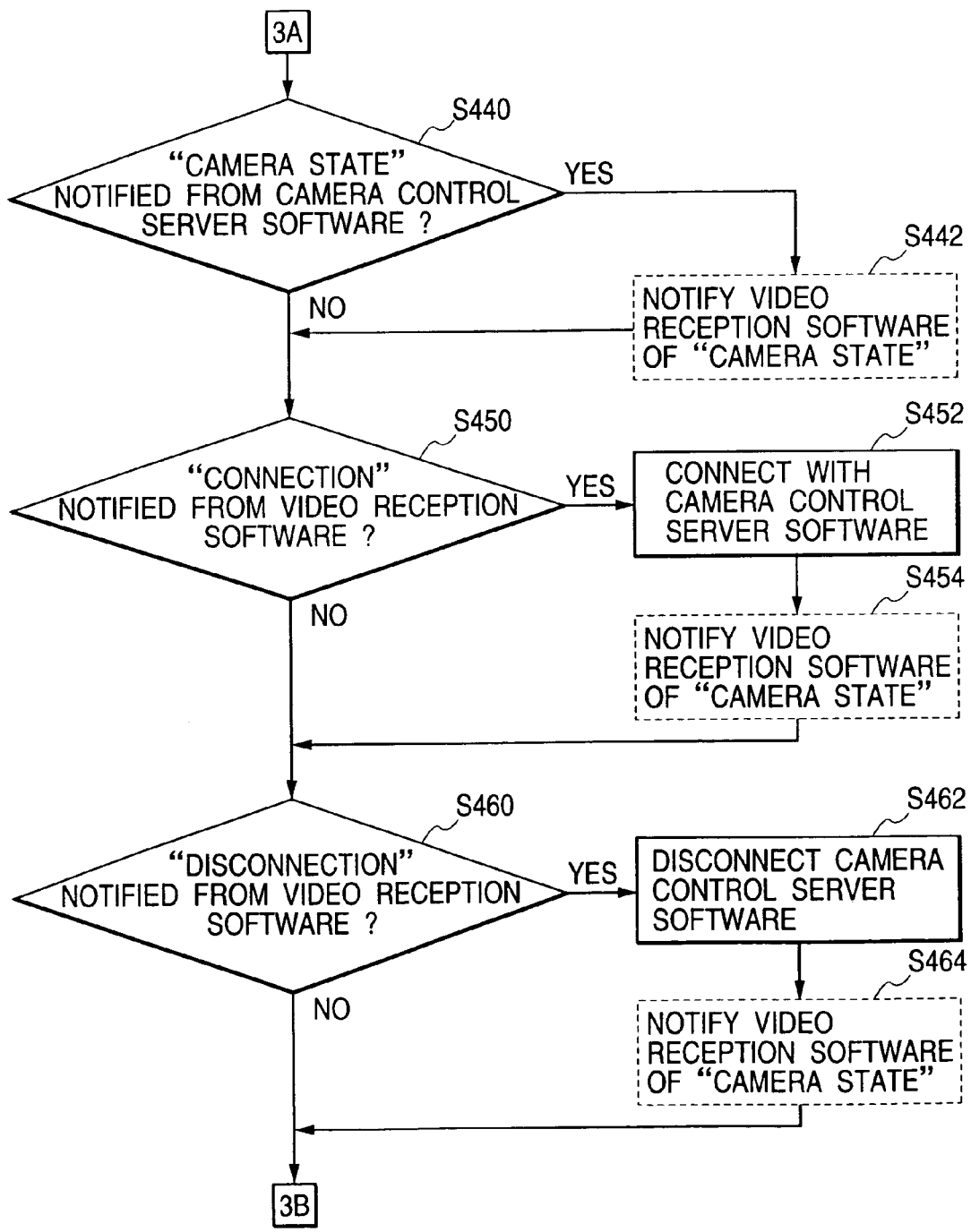
FIG. 22 is a flow chart showing the operation of camera control client software according to one embodiment (first embodiment) of the present invention.

(Camera Control Client Software: FIGS. 21 and 22)

In step S400, the camera control client software 411 starts operation, and the camera control window (e.g., the video camera control panel 640) is displayed on the bit map display 135.

In steps S410 and S412, if the video reception software ends due to the processing in steps S220 to S228, or if the camera control server software ends due to the processing in steps S620 to S622, the camera control client software disconnects the camera control server software, whereby the camera control client software ends.

In steps S420 and S422, if a focus change is notified by the processing in steps S234, S267 and S287, the camera control client software checks whether or not the focused video camera is currently controllable (accessible). If controllable, for example, the control button on the video camera control panel 640 is made available.

In steps S430, S432 and S435, if the camera control is notified from the video reception software in step S282, or if the control button is clicked, the camera control client software transmits the control command to the focused camera.

Steps S440 and S442 represent processing which is performed when the camera control server software returns to the video reception software notification that a control command from the camera control server software was received in step S642, by the processing in steps S430 to S435. Namely, the camera state is notified to the video reception software. The video reception software processes the returned notification in step S295.

In steps S450, S452 and S454, the video reception software connects to the camera control client software corresponding to the camera symbol into which the video is dropped, in response to the notification in step S266. After the connection, the camera control client software notifies the video reception software of the camera state. The video reception software processes this notification in step S295.

In steps S460, S462 and S464, the camera control client software disconnects the focused camera control server software on the basis of the disconnection notification in steps S248, S254 and S264. After the disconnection, the camera state is notified to the video reception software. The video reception software processes this notification in step S295.

Figure 23:
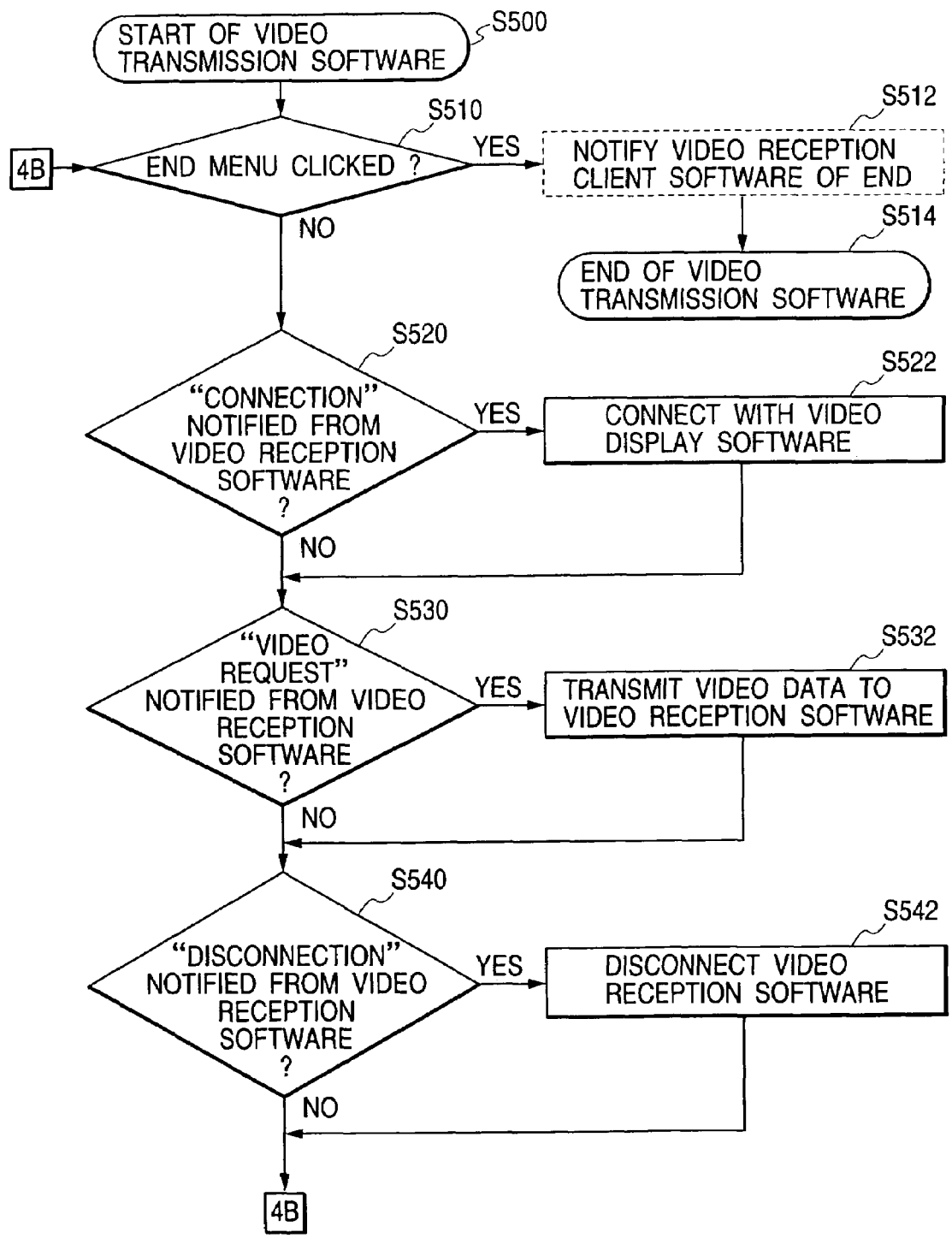
FIG. 23 is a flow chart showing an operation of video transmission software according to one embodiment (first embodiment) of the present invention.

(Video Transmission Software: FIG. 23)

Steps S500, S510, S512, S514, S520, S522, S530, S532, S540 and S542 represent operation of the video transmission software.

Further, these steps represent in detail the processing flows of the video reception client software, the video reception software and the video display software.

Figure 24:
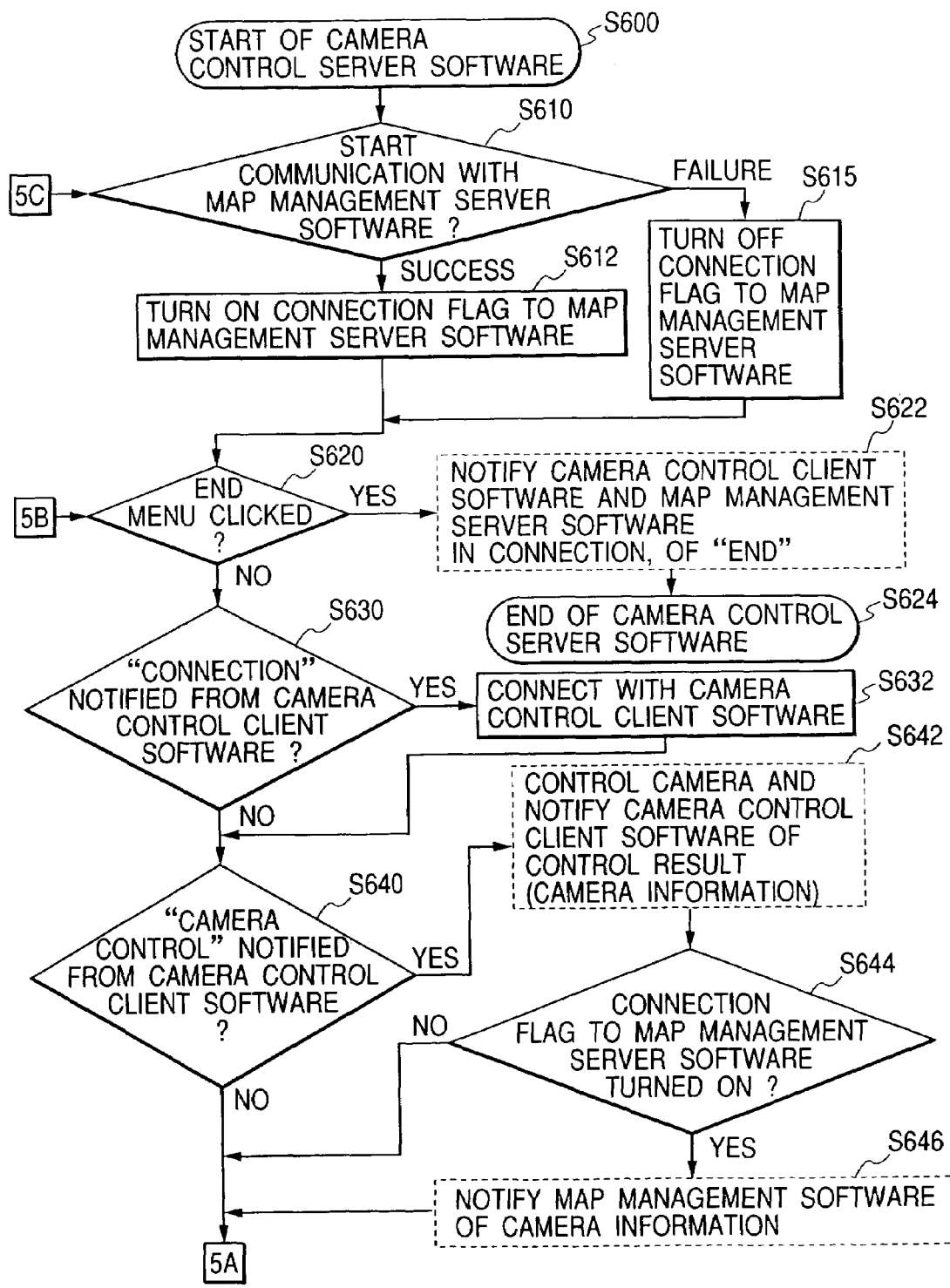
FIG. 24 is a flow chart showing an operation of camera control server software according to one embodiment (first embodiment) of the present invention.
Figure 25:
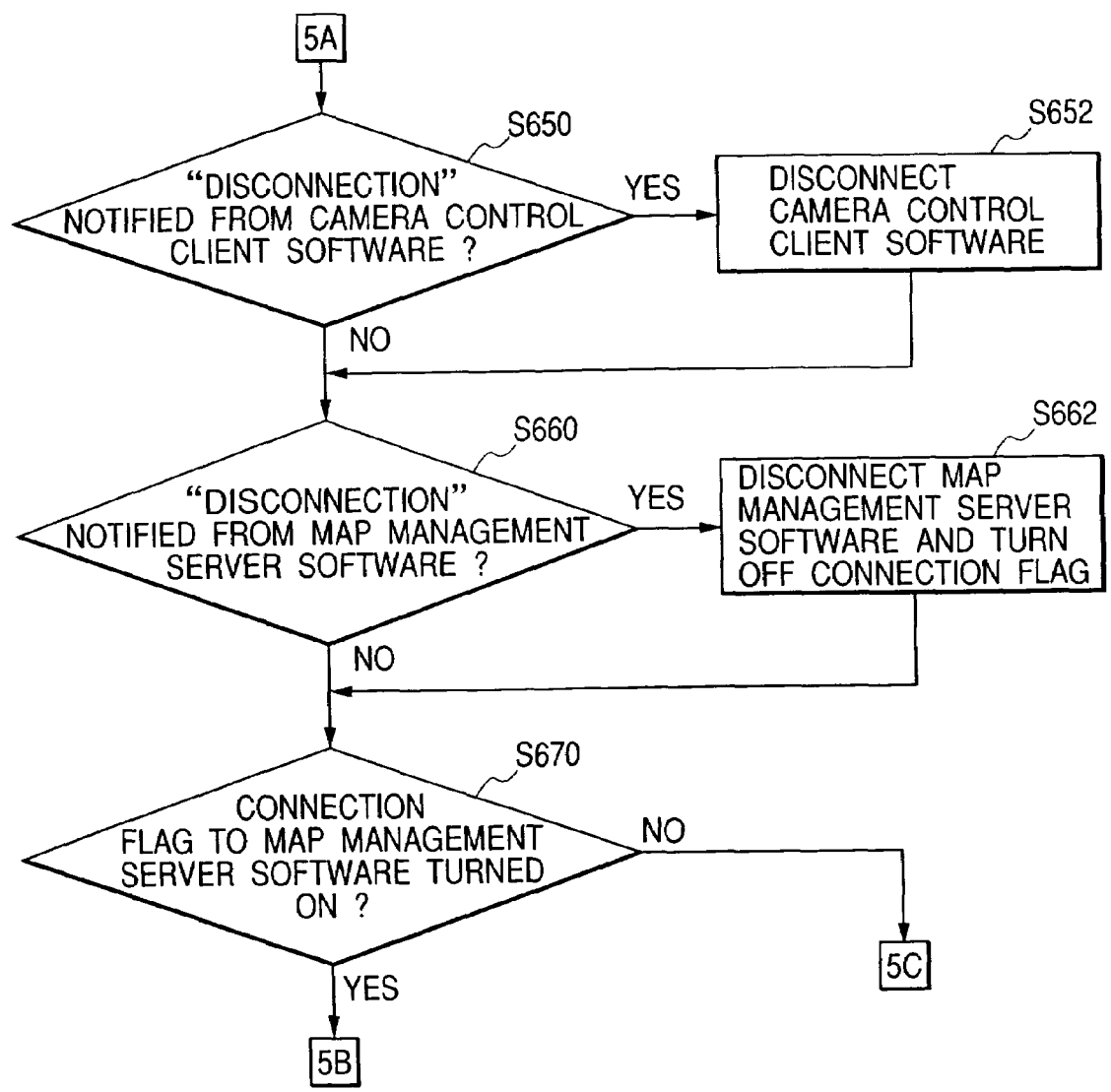
FIG. 25 is a flow chart showing the operation of camera control server software according to one embodiment (first embodiment) of the present invention.

(Camera Control Server Software: FIGS. 24 and 25)

In step S600, the camera control server software starts operation.

In steps S610, S612 and S615, the camera control server software connects to the predetermined map management server software and starts the communication. In this case, an internal flag is set to ON if the camera control server software succeeds in connecting with the map management server software, while the internal flag is set to OFF if the camera control server software 412 fails to make a connection.

Steps S620, S622 and S624 represent processing which is performed when the end menu is clicked by a predetermined operation.

The camera control server software notifies the map management server software, and the camera control client software in connection, of the end. Then the camera control server software ends.

Steps S630 and S632 represent processing which is performed when the camera control client software performs the connection processing in step S452.

Steps S640, S642, S644 and S646 represent processing which is performed when a control instruction is issued from the camera control client software in step S432. In this case, the video camera is controlled, and thus obtained camera information is notified to the camera control client software.

If the connection to the map management server software has been established, the camera state information is notified also to the map management server software.

Steps S650 and S652 represent processing which is performed when the disconnection processing is performed by the camera control client software in step S462.

Step S660 and S662 represent processing which is performed when the map management server software ends in later-described steps S710 to S714.

In this case, the connection ends, and the connection flag is turned OFF.

In step S670, the connection flag to the map management server software is checked, and reconnection processing is performed if the map management server software is not connected.

This processing prevents restart of the entire system when the map management server software is temporarily stopped for some reasons and then restarted.

Figure 26:
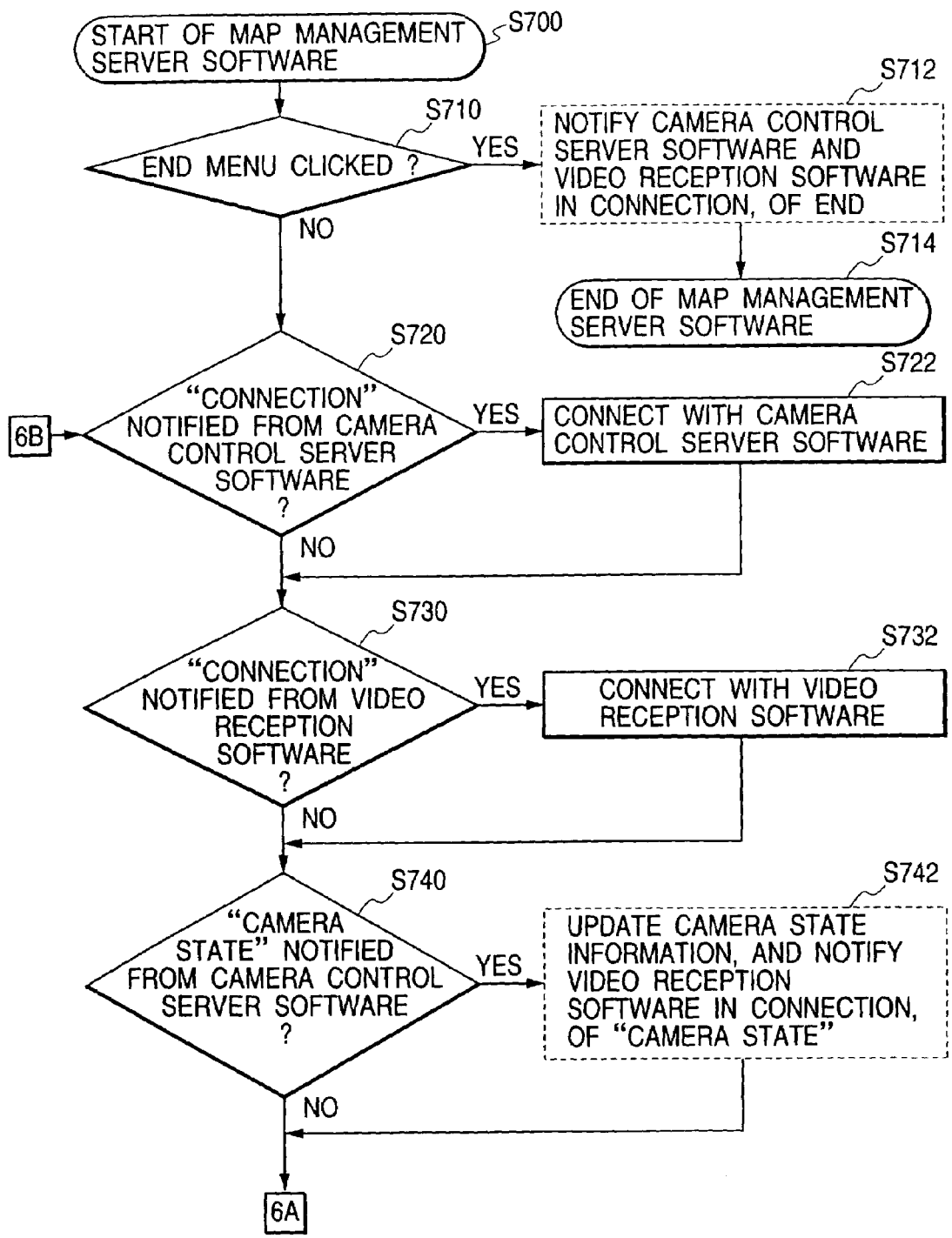
FIG. 26 is a flow chart showing an operation of a map management server software according to one embodiment (first embodiment) of the present invention.
Figure 27:
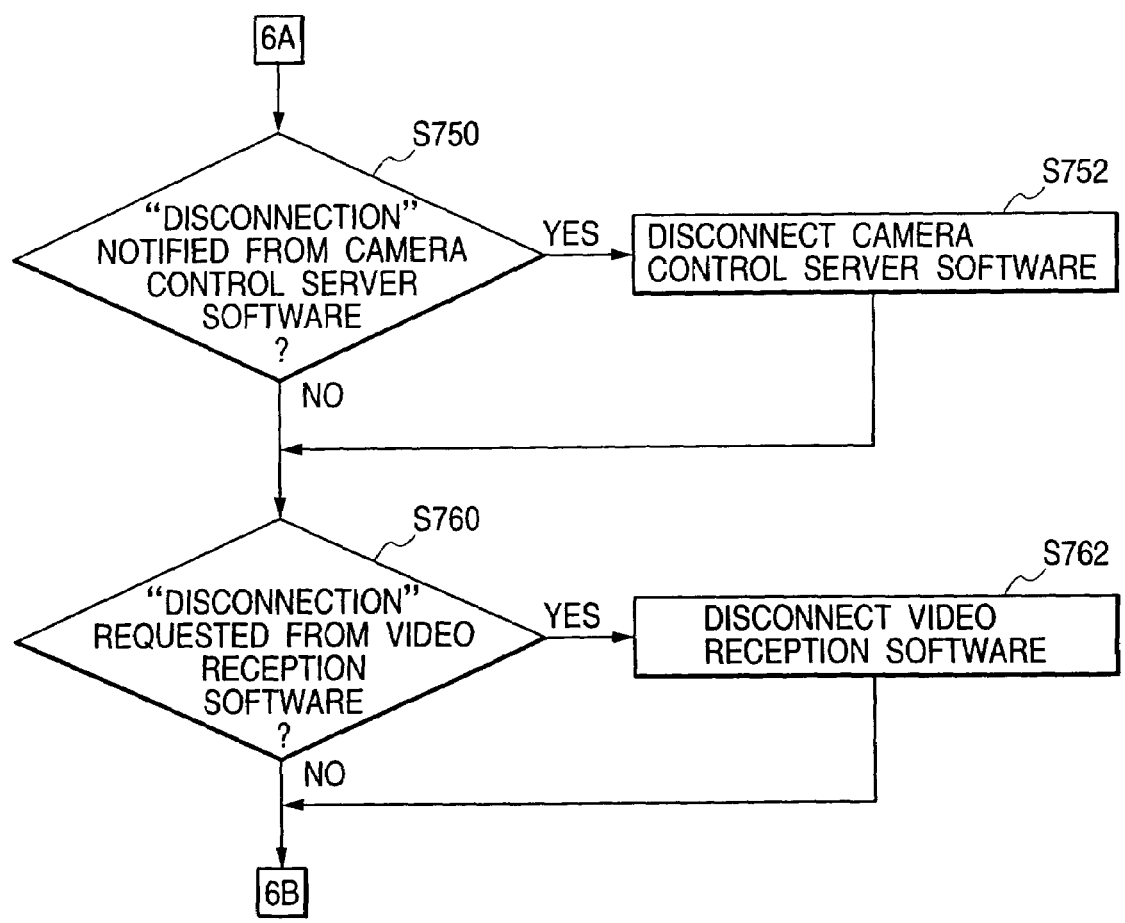
FIG. 27 is a flow chart showing the operation of the map management server software according to one embodiment (first embodiment) of the present invention.

(Map Management Server Software: FIGS. 26 and 27)

In step S700, the map management server software starts operation.

In steps S710, S712 and S714, when the displayed end menu is clicked by a predetermined operation, the map management server software notifies the camera control server software, and the video reception software in connection, of the end. Then the map management server software ends.

In steps S720, S722, S730 and S732, processing waits for a connection request from the camera control server software and the video reception software. If the request is transmitted, the corresponding connection processing is performed.

Steps S750, S752, S760 and S762 represent processing which is performed when disconnection requests are transmitted from the camera control server software and the video reception software. In this case, the corresponding disconnection processing is performed.

Second Embodiment

Figure 28:
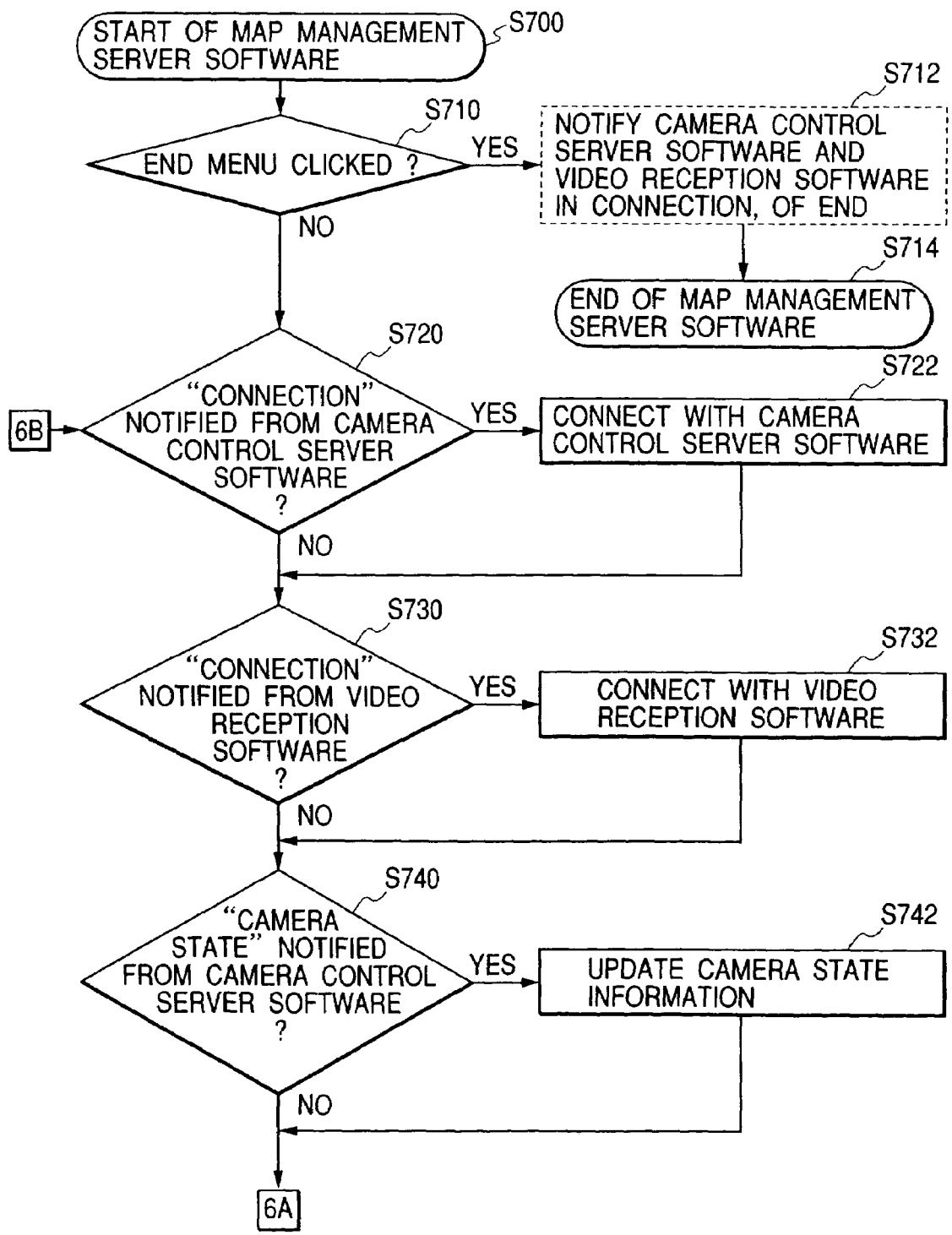
FIG. 28 is a flow chart showing an operation of map management server software according to one embodiment (second embodiment) of the present invention.
Figure 29:
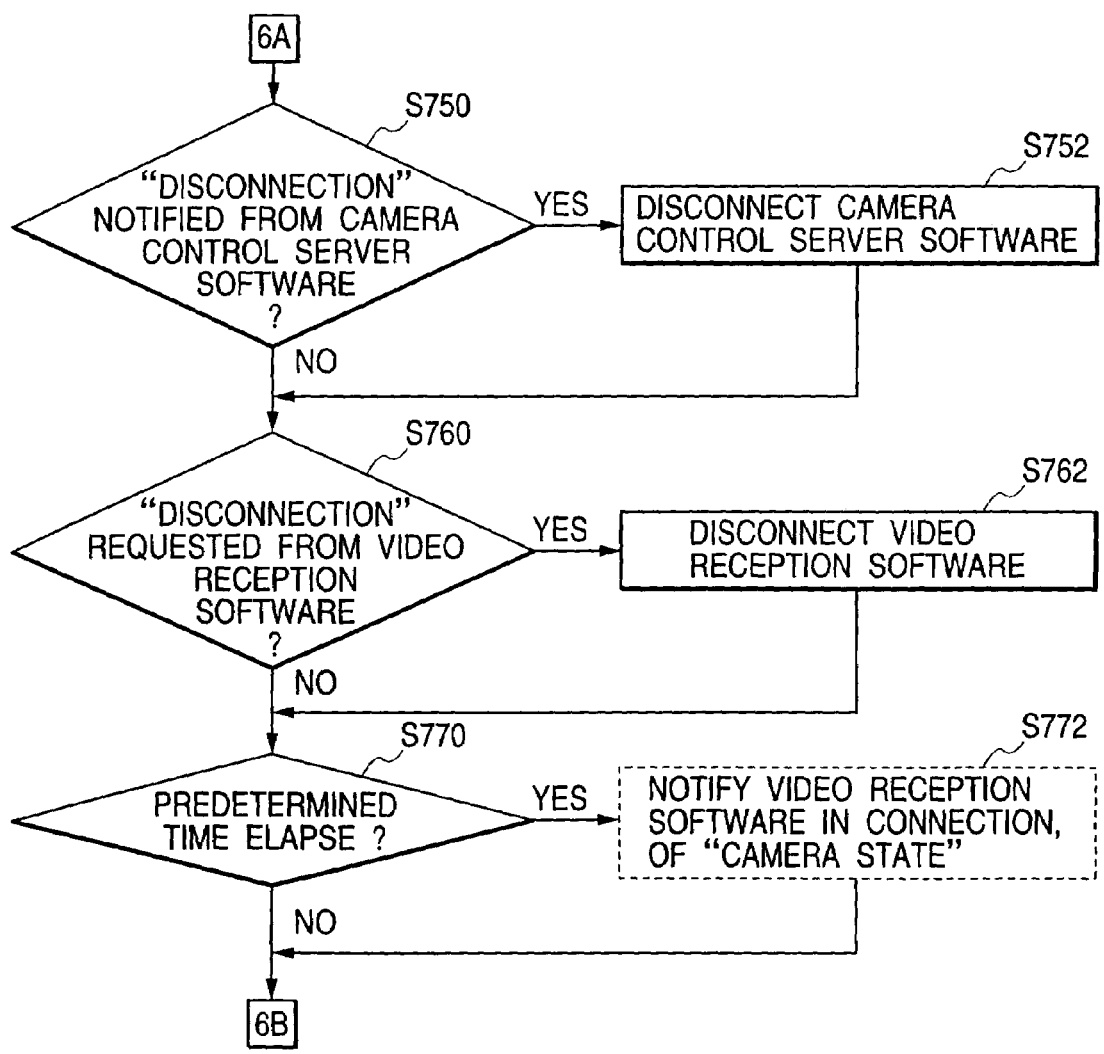
FIG. 29 is a flow chart showing the operation of map management server software according to one embodiment (second embodiment) of the present invention.

FIGS. 28 and 29

In the first embodiment, the camera state is notified to the video reception software at a timing when the camera state is notified from the camera control server software. However, in the second embodiment, the camera state is notified to the video reception software after a predetermined time period elapses.

FIGS. 28 and 29 are flow charts showing operation of the map management server software. It should be noted that the operations of other software in the second embodiment are substantially the same as those in the first embodiment.

The changed parts (i.e., parts different from those of the first embodiment) in the flow charts are as follows.

In steps S740 and S742, if the camera state is notified from the camera control server software, the camera information of the video camera concerned is updated.

In steps S770 and S772, when the previously set (predetermined) time period elapses, the camera information of all the video cameras is notified to the video reception software of the plural monitors in connection.

Third Embodiment

Figure 30:
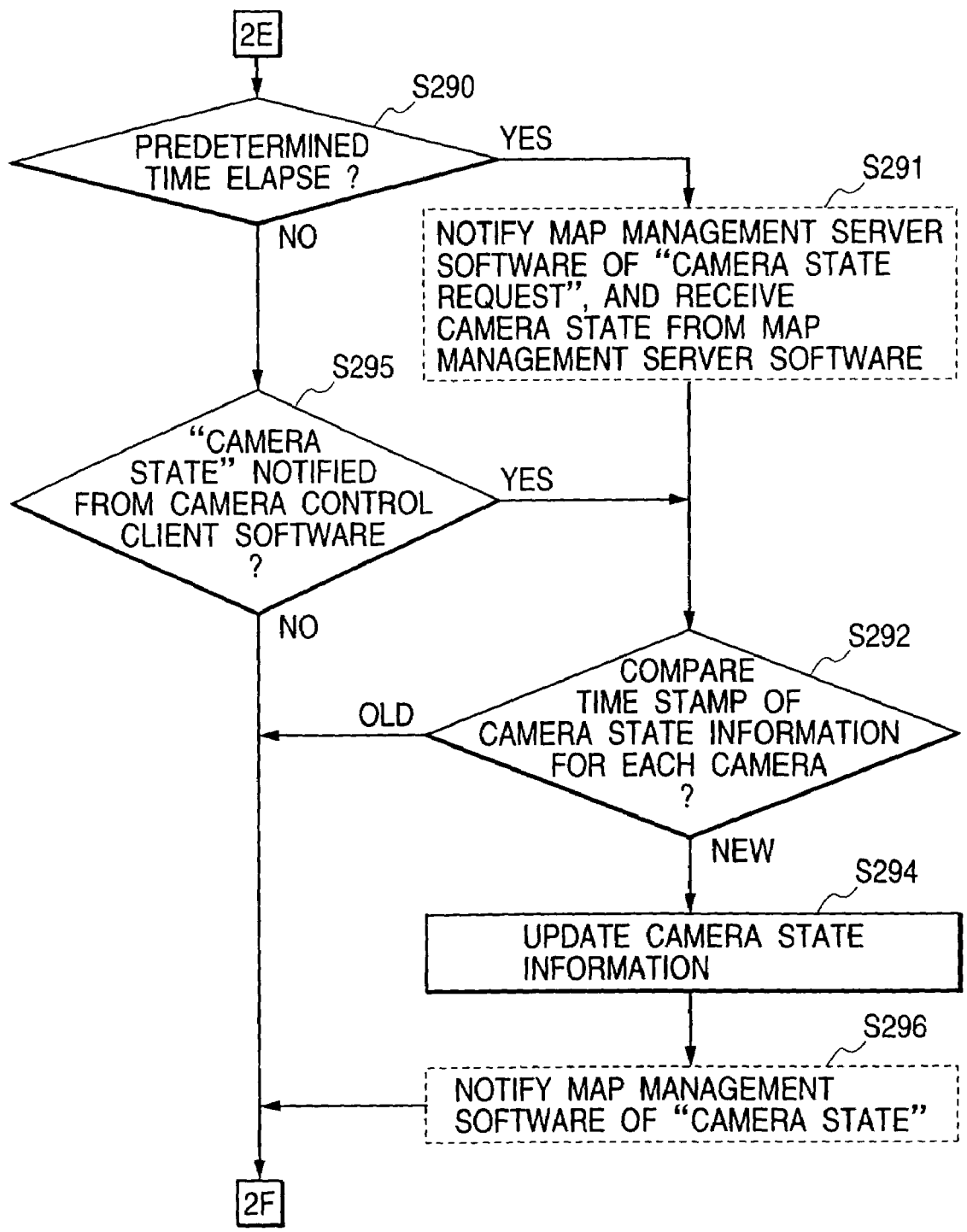
FIG. 30 is a flow chart showing an operation of video reception software according to one embodiment (third embodiment) of the present invention.
Figure 31:
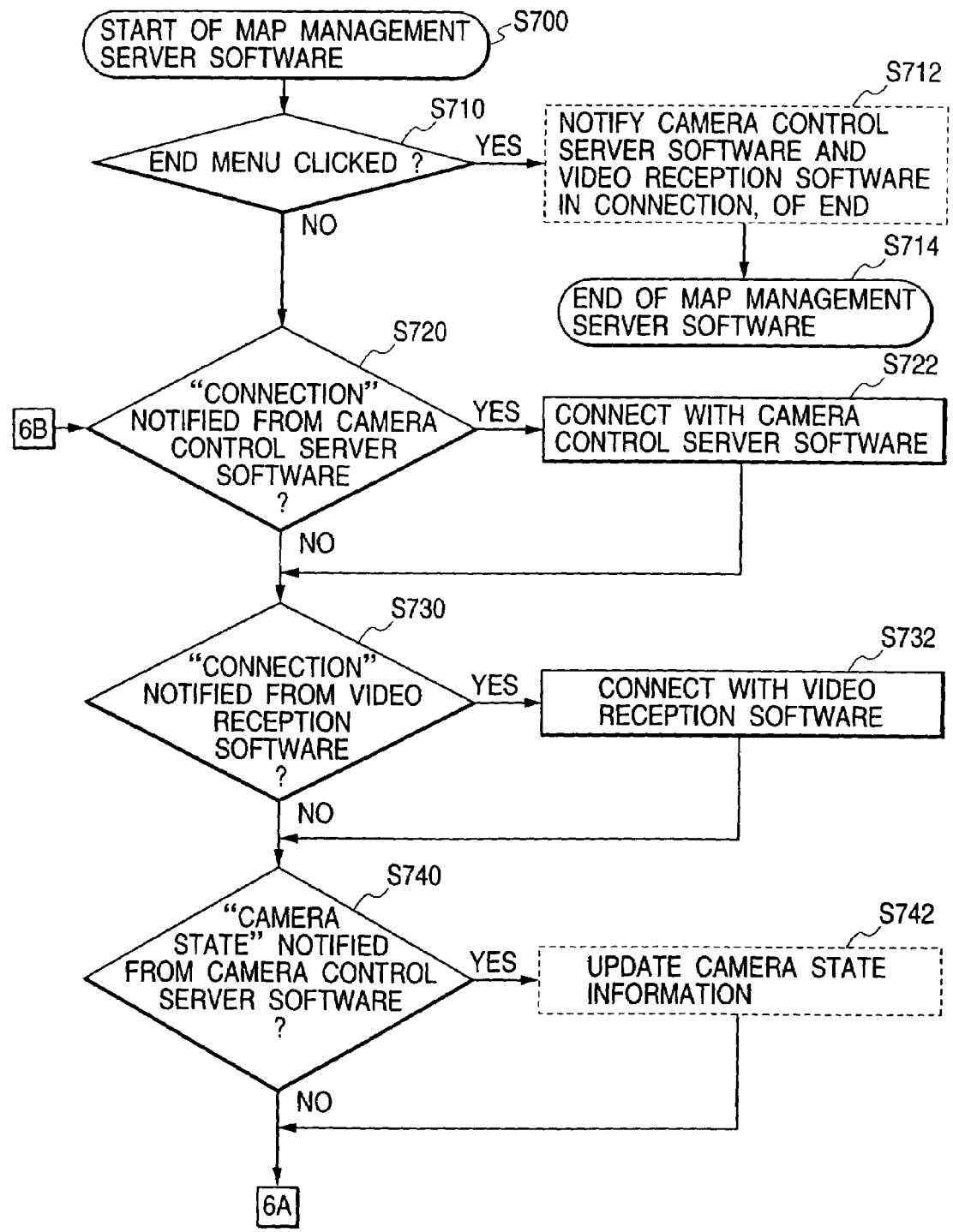
FIG. 31 is a flow chart showing an operation of a map management server software according to one embodiment (third embodiment) of the present invention.
Figure 32:
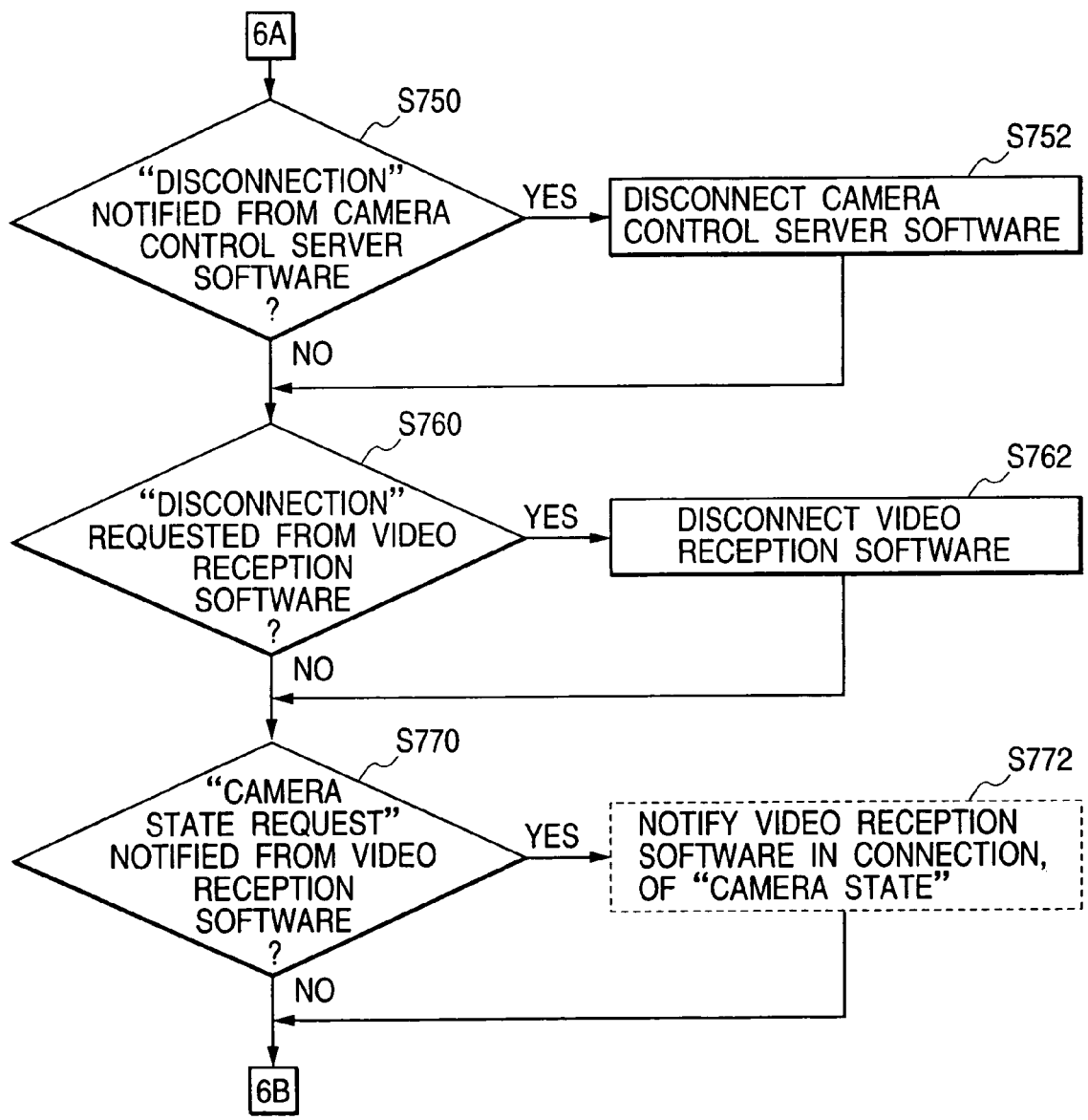
FIG. 32 is a flow chart showing the operation of the map management server software according to one embodiment (third embodiment) of the present invention.

FIGS. 30, 31 and 32

In the first embodiment, the map management server software notifies the camera state to the video reception software. However, in the third embodiment, the video reception software inquires of the map management server software as to the camera state every time a predetermined time period elapses.

FIG. 30 shows the operation flow of the third embodiment which is different from that of the first embodiment.

The changed parts (i.e., parts different from those of the first embodiment) in the flow charts are as follows. It should be noted that the operations of other software in the third embodiment are substantially the same as those in the first embodiment.

In steps S290 and S291, instead of the processing in which the camera state notification is checked from the map management server software, a map state request is notified to the map management server software every time a predetermined time period elapses, and the video reception software waits until the camera state is notified. It should be noted that the processing after the camera state is notified is the same as that in the first embodiment.

FIGS. 31 and 32 show the operation flow of the map management server software.

The changed parts (i.e., parts different from those of the first embodiment) in the flow charts are as follows. It should be noted that the operations of other software in the third embodiment are substantially the same as those in the first embodiment.

In steps S740 and S742, if the camera state is notified from the camera control server software, the camera information of the video camera concerned is updated. At this timing, the camera state is not notified to the video reception software in connection.

In steps S770 and S772, if a camera state request is notified from the video reception software, the camera state is notified to the video reception software concerned. Unlike the first embodiment, such camera state is not notified simultaneously to all the video reception terminals connected to the map management server software.

Fourth Embodiment

Figure 33:
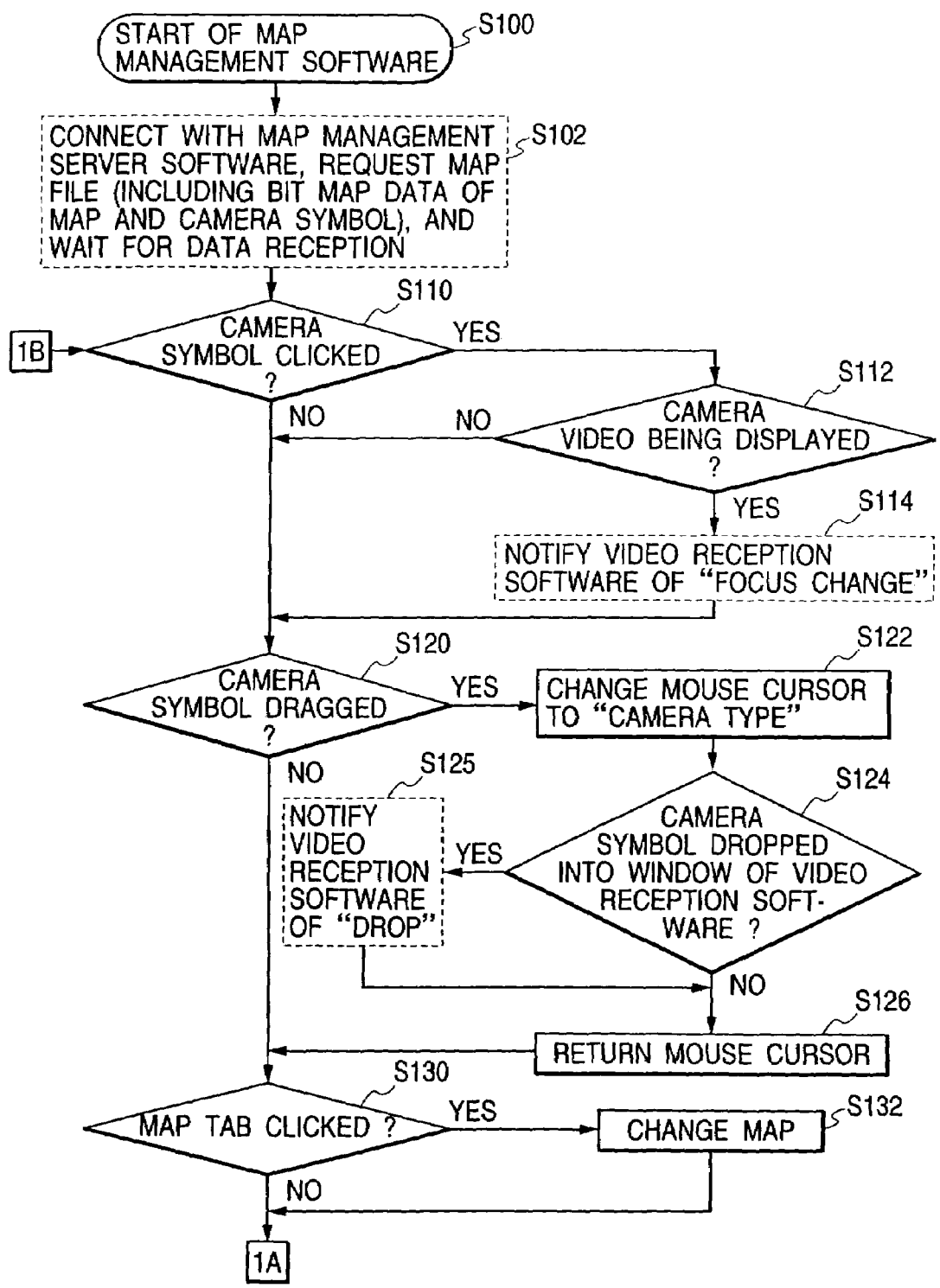
FIG. 33 is a flow chart showing an operation of map management software according to one embodiment (fourth embodiment) of the present invention.
Figure 34:
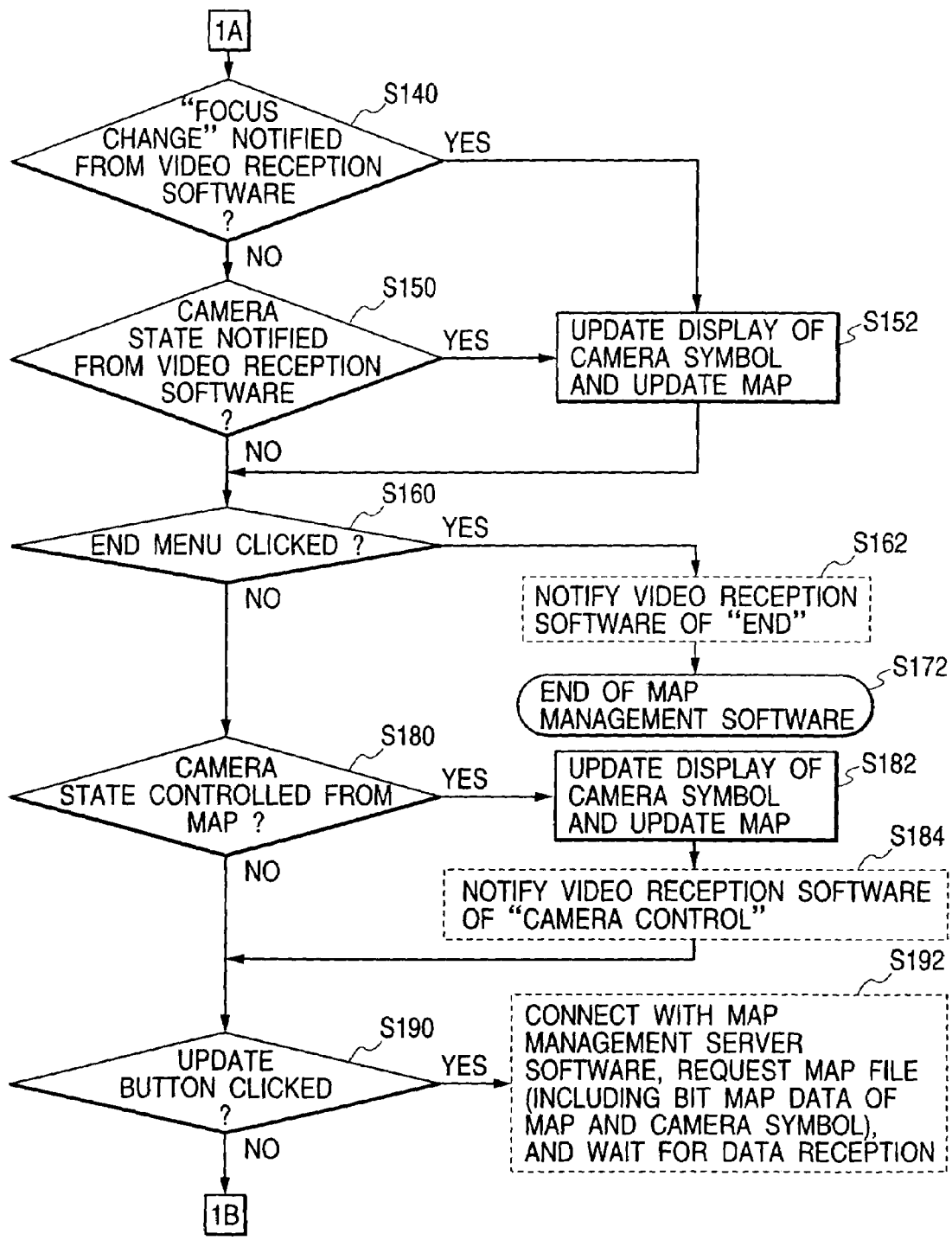
FIG. 34 is a flow chart showing the operation of map management software according to one embodiment (fourth embodiment) of the present invention.
Figure 35:
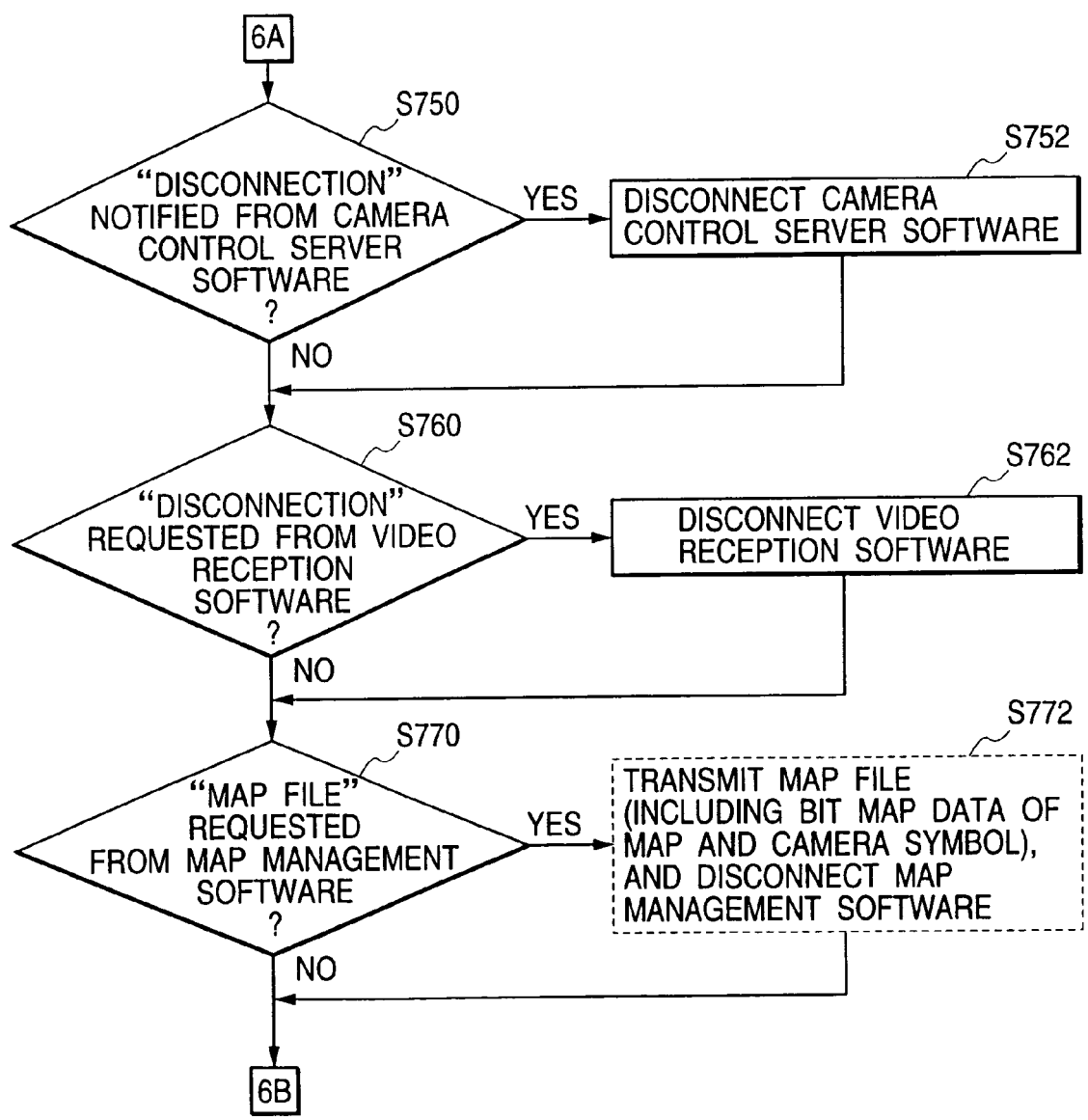
FIG. 35 is a flow chart showing an operation of a map management server software according to one embodiment (fourth embodiment) of the present invention.

FIGS. 33, 34 and 35

In the first to third embodiments, the file which represents the structure of the map itself is called a "map file", in which bit map images, such as the map and the camera symbols, the locations of the camera symbols on the map, the kinds of video cameras and the like have been written, is held in each map management software.

However, in the fourth embodiment, the map management server software unitarily manages the map file.

In the fourth embodiment, in addition to the camera state when the system is operating, the bit map images of the map and the camera symbols, the locations of the camera symbols on the map are unitarily managed. Thus, the user can use the identical map at all monitors accessing the identical map management server software.

In the present embodiment, a communication capability to the map management server software is added to the map management software in the first embodiment, whereby the map management software of the monitor 60 can obtain the bit map images of the map and the camera symbols from the map management server software of the video monitor 20.

The changed parts (i.e., parts different from those of the first embodiment) in the flow charts are shown in FIGS. 34 and 35. It should be noted that the operations of other software in the fourth embodiment are substantially the same as those in the first embodiment on the premise that "camera information" (i.e., the camera information of all the video cameras) is replaced with "map file" information (i.e., bit map images such as the map and the camera symbols, the locations of the camera symbols on the map, the kinds of video cameras, and the camera information of all the video cameras).

Figure 11:
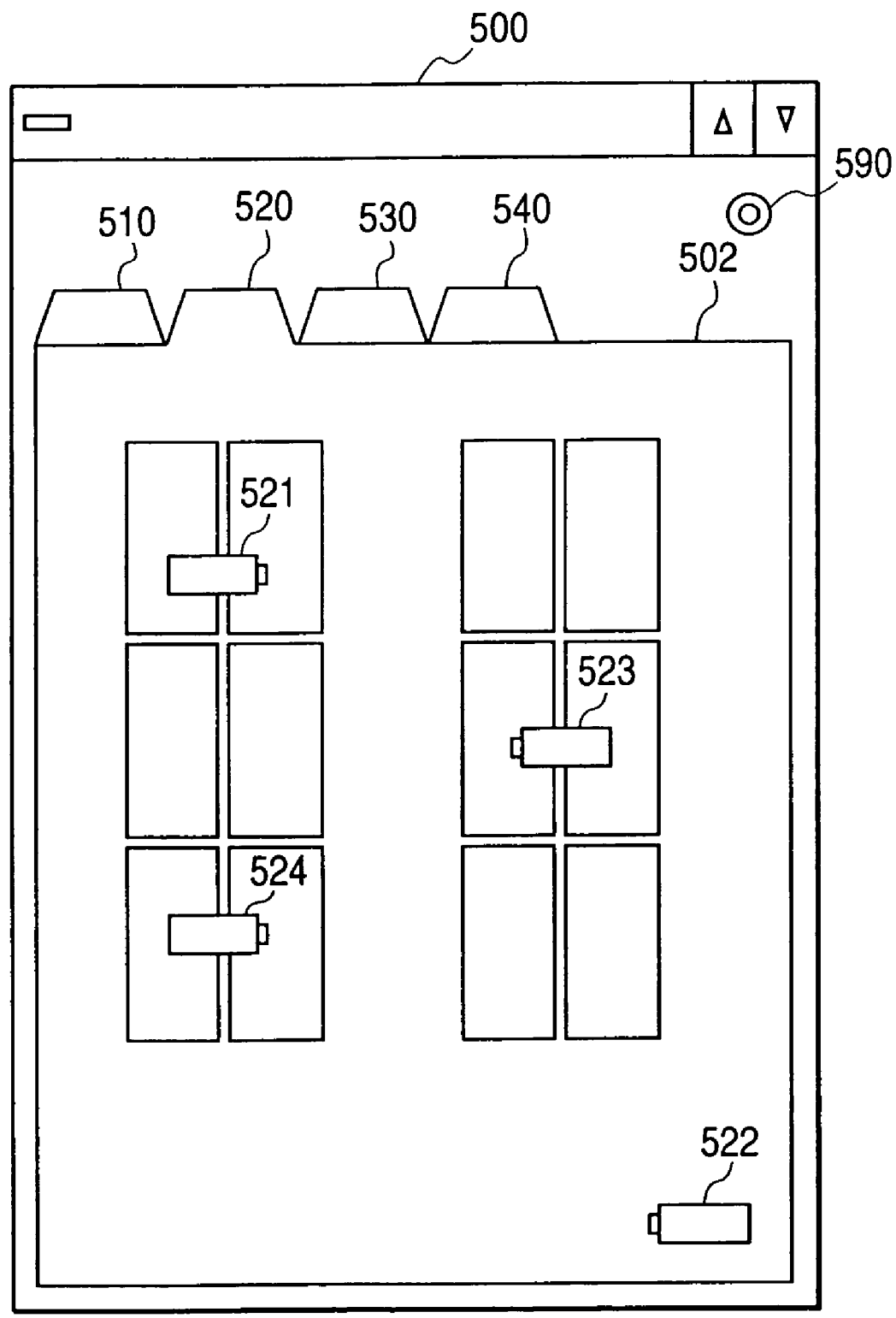
FIG. 11 is a view showing a display example of the monitor according to one embodiment (fourth embodiment) of the present invention.

However, if the bit map file is frequently copied, a load is placed on the processing. Therefore, the bit map file may be copied only at a timing when the map management software starts and when an update button 590 of FIG. 11 is clicked by the mouse.

In step S102, if the map management software starts, it connects to the map management server software and requests a map file (i.e., bit map images such as the map and the camera symbols, the locations of the camera symbols on the map, the kinds of video cameras, and the camera information of all the video cameras). Then the map management software receives the data, and displays the map and the camera symbols on the window in accordance with the received data.

In steps S190 and S192, when the update button is clicked, the map management software connects to the map management server software, requests a map file (i.e., bit map images such as the map and the camera symbols, the locations of the camera symbols on the map, the kinds of video cameras, and the camera information of all the video cameras), and receives the data. Then the map management software displays the map and the camera symbols on the window in accordance with the received data.

By the above processing, in the case where bit map images such as the map and the camera symbols, and the locations of the camera symbols on the map are changed while the map management software is running, it is possible to obtain the data after the change without restarting the system.

In steps S770 and 772, if a map file is requested from the map management software, the map file is transmitted, and the map management software is disconnected.

By the above procedure, a map file can be always maintained and updated unitarily, whereby the user can use the identical map at all monitors accessing the identical map management server software. Also, the new camera information can be always displayed.

In this case, although the present embodiment has been explained in the form of expansion of the system already explained in the first embodiment, the present embodiment is not limited to this.

For example, the map management server software may be replaced with Web server software, the map management software may be replaced with Web browser software, and the video display client software or the camera control client software may be replaced with plug-in software or helper application.

In this case, a map file may be obtained from the Web server software every time an update button on Netscape Navigator or Internet Explorer is clicked, as shown in the third embodiment.

Further, by using a so-called server push method which transmits the data from the Web server software to the Web browser software without request from the Web browser, a map file transmitted as in the first and second embodiments may be received.

Fifth Embodiment

Figure 36:
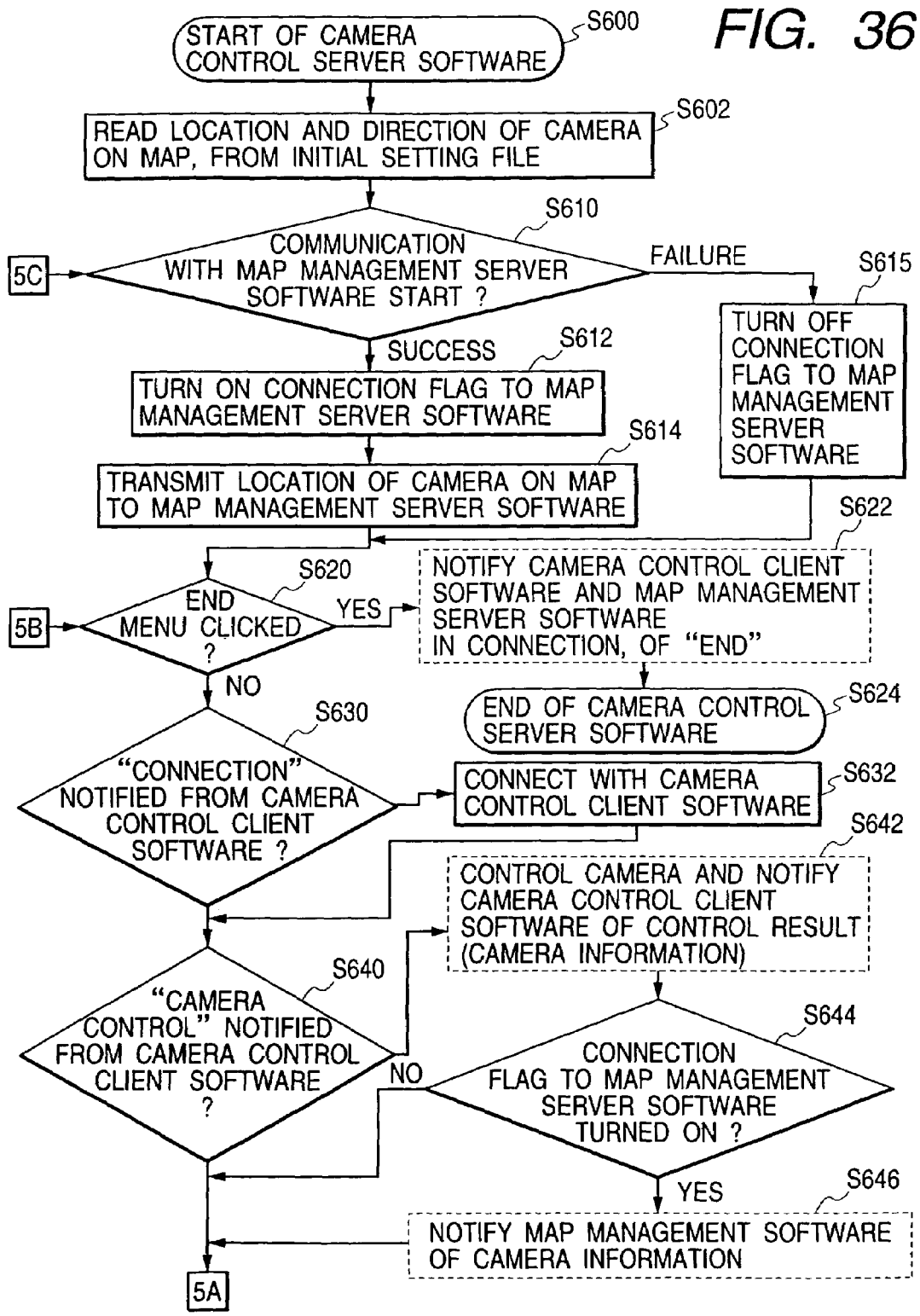
FIG. 36 is a flow chart showing an operation of camera control server software according to one embodiment (fifth embodiment) of the present invention.
Figure 37:
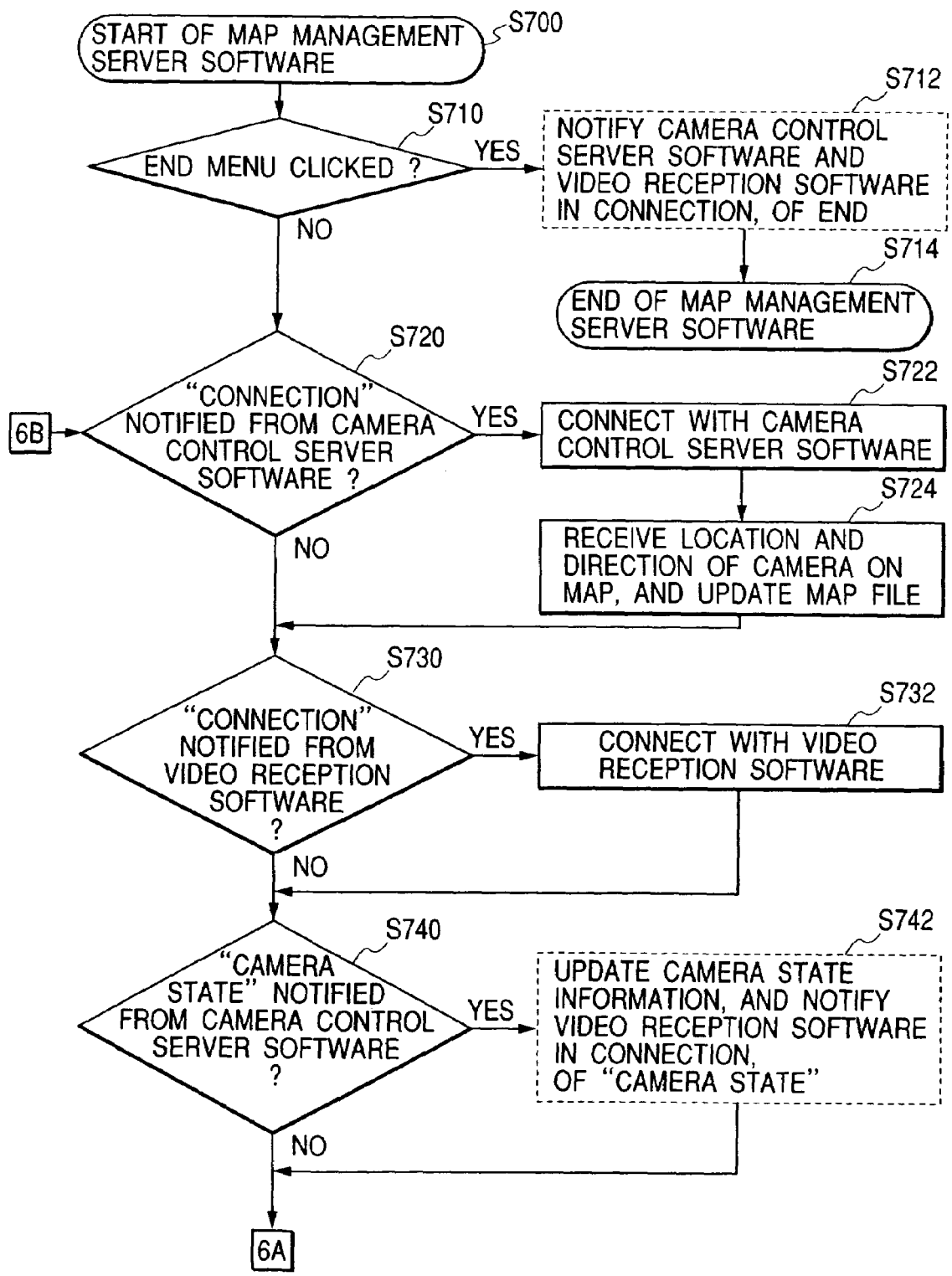
FIG. 37 is a flow chart showing an operation of a map management server software according to one embodiment (fifth embodiment) of the present invention.
Figure 38:
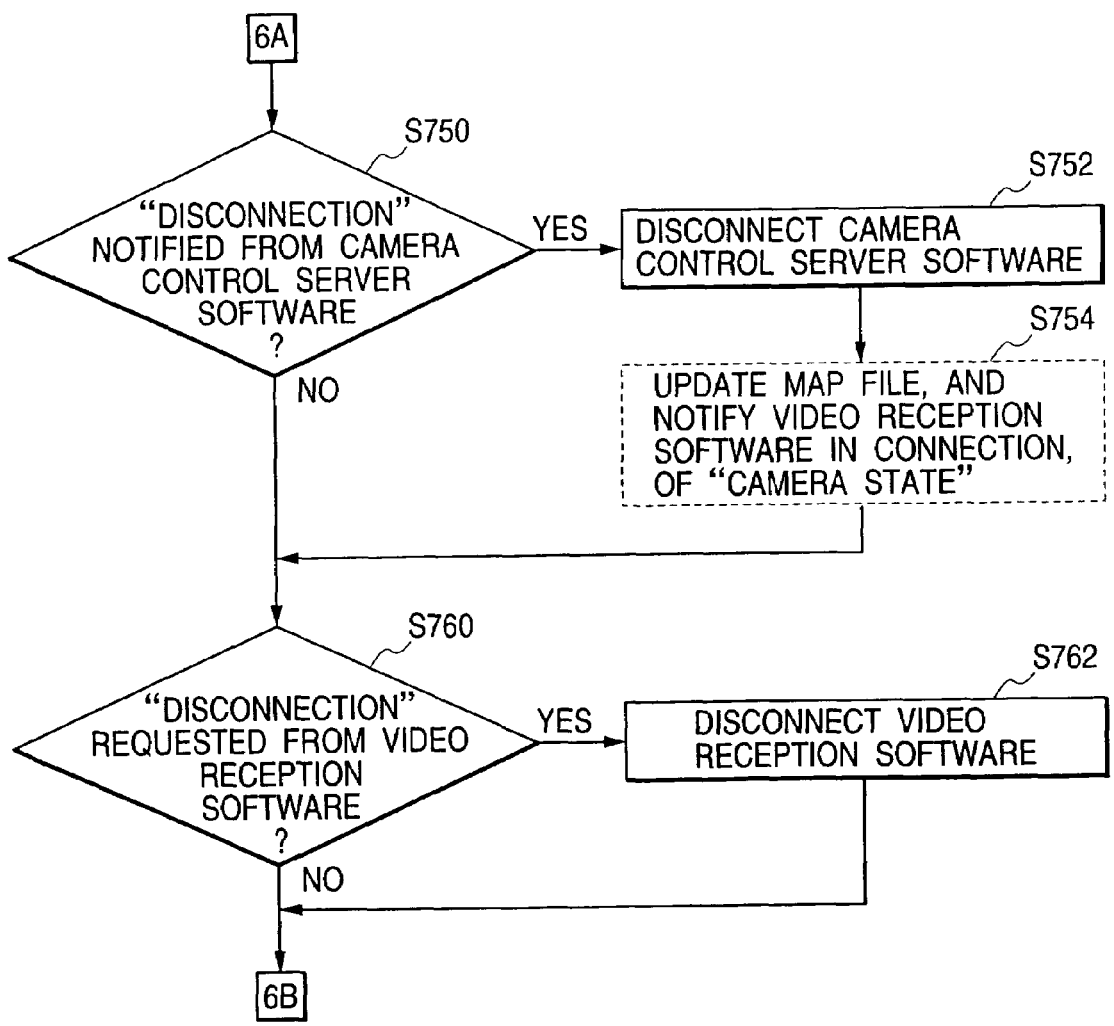
FIG. 38 is a flow chart showing the operation of the map management server software according to one embodiment (fifth embodiment) of the present invention.

FIGS. 36, 37 and 38

In the fourth embodiment, bit map images such as the map and the camera symbols and the locations of the camera symbols on the map are unitarily managed by the map management server software.

When the actual camera disposing location and the initial direction of a pan head are changed, it is necessary to update the map file according to the change. However, the video camera is not always disposed at the location in the vicinity of the map management server software; if so, the user must move to the location of the map management server software and change the map file after the actual camera disposing location is changed. It seriously increases costs to do so, both in time and operation.

The fifth embodiment is directed to one example to solve such a problem. In the present embodiment, coordinates of the camera symbol on the map corresponding to the video camera concerned and an input unit for inputting the initial direction of the pan head are provided for the camera control server software. Further, a communication unit for communicating the input information to the camera management server software is also provided.

The changed parts (i.e., parts different from those of the first embodiment) in the flow charts are shown in FIGS. 36 to 38.

In step S602, when the camera control server software starts, the coordinates of the camera symbol on the map connected to the video transmitter in which the camera control server software concerned is running and the initial direction of the pan head are read from the predetermined initial setting file.

In step S612, if the connection to the map management server software ends, the coordinates of the video camera on the map and the initial direction of the pan head are notified to the map management server software.

The map management server software receives the data and updates the map file.

In step S724, if the connection to the camera control server software ends, the map file is updated according to the notified coordinates of the video camera on the map and the notified initial direction of the pan head.

Step S754 represents processing which is performed when the camera control server software ends and the disconnection is notified.

The disconnection processing is performed, the map file is updated, and the fact that the camera control server software is not running is notified to the video reception software.

The video reception software notifies the map management software of such information, and the map management software updates the map symbol.

Other Embodiments

The present invention is applicable to a system composed of plural pieces of equipment (e.g., a host computer, interface equipment, a reader, a printer and the like) or to an apparatus including only a single piece of equipment (e.g., a copying machine, a facsimile machine or the like).

Needless to say, an object of the present invention can be achieved in a case where a storage medium storing the program codes of software for realizing the functions of the above-described embodiments is supplied to a system or an apparatus, and then a computer (or CPU or MPU) in the system or the apparatus reads and executes the program codes stored in the memory medium.

In this case the program codes themselves read from the storage medium realize the functions of the embodiments, and the storage medium storing such program codes constitutes the present invention.

The storage medium storing the program codes can be, for example, a floppy disk, a hard disk, an optical disk, a magnetooptical disk, a CD-ROM, a CD-R, a magnetic tape, a non-volatile memory card, a ROM, or the like.

The present invention also includes not only the case where the functions of the embodiments are realized by the execution of the program codes read by the computer, but also a case where an OS (operating system) or the like functioning on the computer executes all the process or a part thereof according to the instructions of the program codes, thereby realizing the functions of the embodiments.

The present invention further includes a case where the program codes read from the storage medium are first stored in a memory provided in a function expansion board inserted into the computer or a function expansion unit connected to the computer, and a CPU or the like provided in the function expansion board or the function expansion unit executes all the process or a part thereof according to the instructions of such program codes, thereby realizing the functions of the embodiments.

According to the above-explained embodiments, the information of the video camera and the map information in the vicinity of the location at which the video camera is disposed can be unitarily managed, and the managed information can be notified to all the terminals operating the video cameras timewise as accurately as possible.

Further, in the communication apparatus which is connected to at least one camera and at least one monitor and manages information concerning the state of the camera, there are provided reception means for receiving the information concerning the state of the camera, and transmission means for transmitting the information concerning the state of the camera received by the reception means to the monitor, so as to change a display concerning the state of the camera displayed on the monitor, whereby the state of the camera can be recognized at the monitor.

Further, when the image data taken by the camera is received by the monitor, the states of the camera (i.e., the disposing location, the photographing range, the information of zooming) can be simultaneously grasped.

Further, if information concerning the state of the camera is transmitted according to the change of the state of the camera, the state of the camera can be quickly grasped. Further, since such transmission is performed according to a request from the monitor, the state of the camera can be grasped as necessary, without redundant transmission.

Further, in a communication apparatus which is connected to at least one camera and at least one monitor and manages information concerning the state of the camera, there are provided reception means for receiving the information concerning the state of the camera, processing means for changing a display image concerning the state of the camera displayed on the monitor, in accordance with received information concerning the state of the camera, and transmission means for transmitting the display image concerning the state of the camera processed by the processing means, to the monitor, whereby the display image concerning the state of the camera can be obtained at the monitor. Therefore, if information concerning the state of the camera is received at the monitor and a display image is formed according to the received result, it is possible to prevent a need that the size of the monitor be increased.

As a result, for example, as the number of the monitors increases, it is possible to reduce the size of the overall apparatus in the system including the cameras, the communication units and the monitors.

Further, since transmission is performed according to a request from the monitor, it is possible to limit the number of transmissions of data (i.e., the image) of which data quantity is large.

Further, transmission means is provided which transmits the information concerning the state of the camera to the monitor such that the information concerning the state of the camera is reflected on the map screen for controlling the camera displayed on the monitor. Thus, even if the camera is distant from the monitor, the state of the camera can be quickly reflected on the monitor. For this reason, for example, if plural cameras are provided, the load to the operator can be reduced as compared with the case where the operator sets the state information of the plural cameras after he sets the plural cameras. Thus, it is possible to prevent an error in which the state of the camera does not coincide with that of the monitor.

What is claimed is:

1. A communication system which includes a camera server connected to at least one camera and a plurality of terminals,
wherein said camera server comprises:
   (a) a managing device that manages camera state information received from said camera, wherein the camera state information includes a time stamp which indicates an information transmission time of said camera and attribution information of said camera which indicates at least one of pan, tilt, and zoom of said camera; and
   (b) a transmission device that, in response to receiving new camera state information from said camera, transmits the new camera state information to the plurality of terminals, and
wherein each of said plurality of terminals comprises:
   (a) a display device that displays a map representing a location at which said camera is disposed, wherein the map includes a symbol image to be superimposed on a map image and which indicates the state of at least one of pan, tilt, and zoom of said camera;
   (b) a control device that transmits a control command for changing at least one of pan, tilt, and zoom of said camera to said camera;
   (c) a notification device that provides notification of camera state information including a time stamp which indicates an information transmission time of said control device and attribution information of said camera which indicates at least one of pan, tilt, and zoom of said camera to be controlled by said control device;
   (d) a determination device that when the camera state information is received from said transmission device or notified by said notification device, determines whether the time stamp included in the camera state information which is currently received or notified is newer than the time stamp included in the camera state information which has been already received or notified; and
   (e) a display control device that when it is determined that the time stamp included in the camera state information which is currently received is newer, controls said display device to display the symbol image in accordance with the attribution information included in the camera state information which is currently received.

2. The communication system according to claim 1, wherein said management device manages a plurality of camera state information of a respectively corresponding plurality of cameras, and wherein said display device displays a plurality of symbol images respectively corresponding to the plurality of cameras.

3. The communication system according to claim 1, wherein said transmission device transmits the new camera state information to said plurality of terminals every time a predetermined time is elapsed.

4. A display control method of a communication system which includes a camera server connected to at least one camera and a plurality of terminals, said method comprising the steps of:
   managing camera state information received from the camera, wherein the camera state information includes a time stamp which indicates an information transmission time of the camera and attribution information of the camera which indicates at least one of pan, tilt, and zoom of the camera;
   in response to receiving new camera state information from the camera, transmitting the new camera state information to the plurality of terminals;
   displaying, on a display device of the plurality of terminals, a map representing a location at which the camera is disposed, wherein the map includes a symbol image to be superimposed on a map image and which indicates the state of at least one of pan, tilt, and zoom of the camera;
   transmitting a control command for changing at least one of pan, tilt, and zoom of the camera to the camera;
   notifying the plurality of terminals of camera state information including a time stamp which indicates an information transmission time of the control command and attribution information of the camera which indicates at least one of pan, tilt, and zoom of the camera to be controlled;
   when the camera state information is received or notified, determining whether the time stamp included in the camera state information which is currently received or notified is newer than the time stamp included in the camera state information which has been already received or notified; and
   when it is determined that the time stamp included in the camera state information which is currently received is newer, controlling the display device to display the symbol image in accordance with the attribution information included in the camera state information which is currently received.

5. The display control method according to claim 4, wherein said managing step manages a plurality of camera state information of a respectively corresponding plurality of cameras, and wherein said displaying step displays a plurality of symbol images respectively corresponding to the plurality of cameras.

6. The display control method according to claim 4, wherein said transmitting step transmits the new camera state information to the plurality of terminals every time a predetermined time is elapsed.

* * * * *

UNITED STATES PATENT AND TRADEMARK OFFICE
CERTIFICATE OF CORRECTION

PATENT NO. : 7,222,356 B1  
APPLICATION NO. : 09/480861  
DATED : May 22, 2007  
INVENTOR(S) : Hiroki Yonezawa et al.

Page 1 of 1

It is certified that error appears in the above-identified patent and that said Letters Patent is hereby corrected as shown below:

COLUMN 12:
Line 11, "8276" should read --S276--.

COLUMN 16:
Line 56, "772," should read --S772,--.

Signed and Sealed this

Eleventh Day of March, 2008

JON W. DUDAS
*Director of the United States Patent and Trademark Office*